United States Patent
Iizuka

(10) Patent No.: US 10,897,029 B2
(45) Date of Patent: Jan. 19, 2021

(54) BATTERY PACKAGE, ASSEMBLED BATTERY, AND BATTERY DEVICE

(71) Applicant: FUJIMORI KOGYO CO., LTD., Tokyo (JP)

(72) Inventor: Hirokazu Iizuka, Tokyo (JP)

(73) Assignee: FUJIMORI KOGYO CO., LTD., Tokyo (JP)

( * ) Notice: Subject to any disclaimer, the term of this patent is extended or adjusted under 35 U.S.C. 154(b) by 280 days.

(21) Appl. No.: 15/640,911

(22) Filed: Jul. 3, 2017

(65) Prior Publication Data

US 2018/0013102 A1    Jan. 11, 2018

(30) Foreign Application Priority Data

Jul. 6, 2016  (JP) ................. 2016-134112
Jul. 6, 2016  (JP) ................. 2016-134113
Jul. 6, 2016  (JP) ................. 2016-134114

(51) Int. Cl.
  *H01M 2/02*   (2006.01)
  *H01M 2/10*   (2006.01)
  *H01M 10/0525*  (2010.01)

(52) U.S. Cl.
  CPC ......... *H01M 2/0287* (2013.01); *H01M 2/028* (2013.01); *H01M 2/0245* (2013.01); *H01M 2/0262* (2013.01); *H01M 2/0277* (2013.01); *H01M 2/0285* (2013.01); *H01M 2/1077* (2013.01); *H01M 10/0525* (2013.01)

(58) Field of Classification Search
  None
  See application file for complete search history.

(56) References Cited

U.S. PATENT DOCUMENTS

| | | |
|---|---|---|
| 4,408,259 A | 10/1983 | Muranaka et al. |
| 5,547,780 A | 8/1996 | Kagawa et al. |
| 9,343,716 B2 | 5/2016 | Rothkopf et al. |
| 2004/0041537 A1 | 3/2004 | Ishida et al. |
| 2013/0171490 A1 | 7/2013 | Rothkopf et al. |
| 2013/0229147 A1 | 9/2013 | Amagai et al. |
| 2014/0287297 A1 | 9/2014 | Reitzle et al. |
| 2015/0270590 A1 | 9/2015 | Okutani et al. |
| 2015/0325819 A1 | 11/2015 | Minamitani |

FOREIGN PATENT DOCUMENTS

| | | |
|---|---|---|
| JP | S53066530 A | 6/1978 |
| JP | S55-107225 A | 8/1980 |
| JP | H6-267527 A | 9/1994 |
| JP | 2000357494 A | 12/2000 |

(Continued)

OTHER PUBLICATIONS

KR 10-2016-0078508—translation.*
Notice of Allowance for KR Application No. 10-2017-0084099, dated Mar. 29, 2019, 2pp.
Office Action for Korean Patent Application No. 10-2019-0075345 dated Aug. 19, 2019 and English translation thereof; 11 pgs.

(Continued)

*Primary Examiner* — Ladan Mohaddes
(74) *Attorney, Agent, or Firm* — Hauptman Ham, LLP

(57) ABSTRACT

The present invention provides a battery package used in an assembled battery, which can miniaturize the assembled battery and can impart sufficient durability; an assembled battery which can be miniaturized and have sufficient durability by provision with the relevant battery package; and a battery device provided with the relevant assembled battery.

14 Claims, 16 Drawing Sheets

(56) References Cited

FOREIGN PATENT DOCUMENTS

| | | |
|---|---|---|
| JP | 2002-260739 A | 9/2002 |
| JP | 2005-276486 A | 10/2005 |
| JP | 2011-146151 A | 7/2011 |
| JP | 2011-146169 A | 7/2011 |
| JP | 2014-532974 A | 12/2014 |
| JP | 2015-228365 A | 12/2015 |
| JP | 2016-46113 A | 4/2016 |
| JP | 2016-113178 A | 6/2016 |
| JP | 2016-207267 A | 12/2016 |
| KR | 1020130064119 A | 6/2013 |
| KR | 10-2015-0128565 A | 11/2015 |
| KR | 10-2016-0078508 A | 7/2016 |
| TW | 201327982 A1 | 7/2013 |
| WO | 2013/101316 A1 | 7/2013 |
| WO | 2014/068947 A1 | 5/2014 |

OTHER PUBLICATIONS

Office Action for Korean Patent Application No. 10-2017-0084099 dated Sep. 18, 2018 and English translation thereof; 15 pages.
Notice of Allowance for Korean Patent Application No. 10-2019-0075345 dated Feb. 17, 2020 and English translation thereof; 2 pgs.
Office Action for Japanese Patent Application No. 2016-134112 dated Feb. 4, 2020 and English translation thereof; 7 pgs.
Office Action for Japanese Patent Application No. 2016-134113 dated Feb. 4, 2020 and English translation thereof; 5 pgs.
Office Action for Japanese Patent Application No. 2016-134114 dated Feb. 4, 2020 and English translation thereof; 6 pgs.
Office Action for Taiwanese Patent Application No. 106121968 dated Sep. 8, 2020 and English summary thereof; 10 pgs.

\* cited by examiner

BATTERY PACKAGE, ASSEMBLED BATTERY, AND BATTERY DEVICE

CROSS-REFERENCE TO RELATED APPLICATIONS

This application claims the priorities from Japanese Patent Application No. 2016-134112 (filing date: Jul. 6, 2016), Japanese Patent Application No. 2016-134113 (filing date: Jul. 6, 2016), and Japanese Patent Application No. 2016-134114 (filing date: Jul. 6, 2016). The entire teachings of the above applications are incorporated herein by reference.

BACKGROUND OF THE INVENTION

(1) Field of the Invention

The present invention relates to a battery package, an assembled battery, and a battery device.

(2) Description of Related Art

In recent years, amid increase in environment consciousness, as a storage battery for storing electric energy, a secondary battery such as a lithium ion battery has been paid attention. For example, in a storage battery for electric automobiles or the like, for capacity enlargement, an assembled battery which is constructed by connecting a plurality of unit batteries has been used. Specifically, there is an assembled battery having such a structure that a plurality of packed unit batteries in which batteries are accommodated in a package container are connected. Herein, as the package container accommodating a battery, for miniaturization and light weighting, a container composed of a laminate sheet in which a metal foil and a resin layer are layered has been used (for example, see Japanese Unexamined Patent Application, First Publication No. 2000-357494).

SUMMARY OF THE INVENTION

However, the assembled battery is required to be small and have durability, but it was not easy to realize both miniaturization and improvement in durability. For example, when a structure of the assembled battery is simplified for miniaturization, there is a problem that durability is reduced. Additionally, when a protective structure is provided for enhancing durability, miniaturization of the assembled battery becomes difficult.

The present invention has been made in view of the above-mentioned circumstances, and an object thereof is to provide a battery package that is used for an assembled battery having a plurality of unit batteries, can miniaturize the assembled battery, and can afford sufficient durability; an assembled battery that can be miniaturized by provision with the relevant battery package and has sufficient durability; and a battery device provided with the relevant assembled battery.

In order to solve the above-mentioned problems, one aspect of the present invention provides a battery package comprising a plurality of conductor sheets, wherein at least one pair of conductor sheets facing each other among the plurality of conductor sheets are partially adhered at a plurality of linear adhesive parts, the plurality of adhesive parts are formed apart from each other in a width direction orthogonal to a length direction, the one pair of conductor sheets facing each other form a plurality of cylindrical parts partitioned with the adhesive parts, a battery accommodating part is secured inside the cylindrical part, at least one of the one pair of conductor sheets facing each other is continuously formed in a width direction over the plurality of cylindrical parts, the cylindrical part is formed with an intermediate part between the adjacent adhesive parts of the conductor sheets, and at least a part of each of the intermediate parts of the one pair of conductor sheets facing each other has a bending shape that is convexed outward.

It is preferable that each of the intermediate parts of the one pair of conductor sheets facing each other has a substrate part and one pair of side plate parts extending inclined to the substrate part so as to approach the conductor sheets on an opposite side toward a widening direction from both side edges of the substrate part, and the cylindrical part is formed into a hexagonal tubular shape with the substrate part and the side plate part of the one pair of conductor sheets facing each other.

It is preferable that the battery package has a plurality of sets of the one pair of conductor sheets facing each other, and in the conductor sheets both surfaces of which are each adhered to other conductor sheets, an adhesive part at which one of the surfaces is adhered to other conductor sheet, and an adhesive part at which the other surface is adhered to other conductor sheet, are alternately arranged in a width direction.

It is preferable that one of the adhesive part at which one surface of the conductor sheet is adhered to other conductor sheet, and the adhesive part at which the other surface of the conductor sheet is adhered to other conductor sheet, is formed to be wider in width than the other adhesive part.

It is preferable that a space is secured between one of the plurality of sets of conductor sheets and the other set of conductor sheets, the sets adjoining to each other in a thickness direction.

It is preferable that the conductor sheet has a metal layer, and the metal layer faces the battery accommodating part.

It is preferable that the metal layer is formed of a metal foil including one or more kinds selected from the group consisting of aluminum, copper, stainless steel, nickel, and iron.

It is preferable that the conductor sheet is formed of a laminate further having a resin layer, and the resin layer comprises one or more kinds selected from the group consisting of polyester, polyamide, polyimide, polyolefin, an acrylic resin, polyurethane, a fluorine resin, and a thermosetting resin.

It is preferable that the conductor sheets are adhered with a polyolefin-based adhesive at the adhesive parts.

It is preferable that the adhesive includes an acid-modified polyolefin and a crosslinking agent.

Another aspect of the present invention provides an assembled battery comprising: a plurality of unit batteries each having a battery container and a battery body covered with the battery container; and a battery package packaging the unit batteries, wherein the battery package comprises a plurality of conductor sheets, at least one pair of conductor sheets facing each other among the conductor sheets is partially adhered at a plurality of linear adhesive parts, the plurality of adhesive parts are formed apart from each other in a width direction orthogonal to a length direction, the one pair of conductor sheets facing each other form a plurality of cylindrical parts partitioned with the adhesive parts, a battery accommodating part is secured inside the cylindrical part, at least one of the one pair of conductor sheets facing each other is continuously formed in a width direction over the plurality of cylindrical parts, the cylindrical part is formed with an intermediate part between the adjacent adhesive parts of the conductor sheets, at least a part of each of the intermediate parts of the one pair of conductor sheets facing each other has a bending shape that is convexed outward, and the unit batteries are each accommodated in the plurality of battery accommodating parts.

It is preferable that the battery container is a container comprising a laminate in which a metal layer and a resin layer are laminated and accommodating the battery body, and the unit battery has a flat shape.

It is preferable that each of the intermediate parts of the one pair of conductor sheets facing each other has a substrate part and one pair of side plate parts extending inclined to the substrate part so as to approach the conductor sheets on an opposite side toward a widening direction from both side edges of the substrate part, and the cylindrical part is formed into a hexagonal tubular shape with the substrate part and the side plate part of the one pair of conductor sheets facing each other.

It is preferable that the battery package has a plurality of sets of the one pair of conductor sheets facing each other, and in the conductor sheets both surfaces of which are each adhered to other conductor sheets, an adhesive part at which one of the surfaces is adhered to other conductor sheet and an adhesive part at which the other surface is adhered to other conductor sheet are alternately arranged in a width direction.

It is preferable that one of the adhesive part at which one surface of the conductor sheet is adhered to other conductor sheet, and the adhesive part at which the other surface of the conductor sheet is adhered to other conductor sheet, is formed to be wider in width than the other adhesive part.

It is preferable that, a space is secured between one set of conductor sheets facing each other and the other set of conductor sheets facing each other, the sets adjoining to each other in a thickness direction.

It is preferable that the conductor sheet has a metal layer, and the metal layer of the battery package faces the battery accommodating part.

It is preferable that the metal layer of the battery package is formed of a metal foil including one or more kinds selected from the group consisting of aluminum, copper, stainless steel, nickel, and iron.

It is preferable that the conductor sheet is formed of a laminate further having a resin layer, and the resin layer of the battery package includes one or more kinds selected from the group consisting of polyester, polyamide, polyimide, polyolefin, an acrylic resin, polyurethane, a fluorine resin, and a thermosetting resin.

It is preferable that the conductor sheets are adhered with a polyolefin-based adhesive at the adhesive parts.

One aspect of the present invention provides a battery device comprising: the battery, a case for accommodating the battery, a first terminal electrically connected to one of the one pair of conductor sheets facing each other, and a second terminal electrically connected to the other of the one pair of conductor sheets facing each other.

Another aspect of the present invention provides an assembled battery comprising: a plurality of unit batteries; and a battery package packaging the unit batteries, wherein the battery package comprises a plurality of conductor sheets, at least one pair of conductor sheets facing each other among the plurality of conductor sheets is partially adhered at a plurality of linear adhesive parts, the plurality of adhesive parts are formed apart from each other in a width direction orthogonal to a length direction, the one pair of conductor sheets facing each other form a plurality of cylindrical parts partitioned with the adhesive parts, a battery accommodating part is secured inside the cylindrical part, at least one of the one pair of conductor sheets facing each other is continuously formed in a width direction over the plurality of cylindrical parts, the cylindrical part is formed with an intermediate part between the adjacent adhesive parts of the conductor sheets, at least a part of each of the intermediate parts of the one pair of conductor sheets facing each other has a bending shape that is convexed outward, the unit battery comprises a positive electrode current collector, a positive electrode active material layer contacting with the positive electrode current collector, a negative electrode current collector, a negative electrode active material layer contacting with the negative electrode current collector, a separator separating the positive electrode active material layer and the negative electrode active material layer, and an electrolyte, unit batteries are each provided in a plurality of battery accommodating parts, the positive electrode current collector electrically conductively abuts against one of the one pair of conductor sheets facing each other, and the negative electrode current collector electrically conductively abuts against the other of the one pair of conductor sheets facing each other.

It is preferable that each of the intermediate parts of the one pair of conductor sheets facing each other has a substrate part and one pair of side plate parts extending inclined to the substrate part so as to approach the conductor sheets on an opposite side toward a widening direction from both side edges of the substrate part, and the cylindrical part is formed into a hexagonal tubular shape with the substrate part and the side plate part of the one pair of conductor sheets facing each other.

It is preferable that the battery package has a plurality of sets of the one pair of conductor sheets facing each other, and in the conductor sheets both surfaces of which are each adhered to other conductor sheets, an adhesive part at which one of the surfaces is adhered to other conductor sheet, and an adhesive part at which the other surface is adhered to other conductor sheet, are alternately arranged in a width direction.

It is preferable that one of the adhesive part at which one surface of the conductor sheet is adhered to other conductor sheet, and the adhesive part at which the other surface of the conductor sheet is adhered to other conductor sheet, is formed to be wider in width than the other adhesive part.

It is preferable that, a space is secured between one set of conductor sheets facing each other and the other set of conductor sheets facing each other, the sets adjoining to each other in a thickness direction.

It is preferable that on both ends in a length direction of an adhesive part of the battery package, sealing plates closing one and the other openings of the cylindrical part are disposed respectively.

It is preferable that the sealing plate abuts against an opening of the cylindrical part with a sealing member.

It is preferable that the sealing plate sealing one opening of the cylindrical part and the sealing plate sealing the other opening are fixed to the battery package with a fastening and fixing member.

It is preferable that the conductor sheet has a metal layer, and the metal layer faces the battery accommodating part.

It is preferable that the metal layer is formed of a metal foil including one or more kinds selected from the group consisting of aluminum, copper, stainless steel, nickel, and iron.

It is preferable that the conductor sheet is formed of a laminate further having a resin layer, and the resin layer includes one or more kinds selected from the group consisting of polyester, polyamide, polyimide, polyolefin, an acrylic resin, polyurethane, a fluorine resin, and a thermosetting resin.

It is preferable that the conductor sheets are adhered with a polyolefin-based adhesive at the adhesive part.

According to one aspect of the present invention, since a plurality of battery accommodating parts are formed with a common conductor sheet, for example, a part of a connecting structure or the like can be omitted as compared with an assembled battery including a plurality of package containers individually packaging unit batteries, and therefore, a structure of the assembled battery can be simplified. For that reason, miniaturization and light weighting of the assembled battery can be attained.

Additionally, according to one aspect of the present invention, since the positive electrode current collector and the negative electrode current collector of the unit battery are connected to the conductor sheet, the conductor sheet can be made to function as a terminal. For that reason, a structure of the unit battery can be simplified, and it is possible to attain further miniaturization and light weighting of the assembled battery.

Additionally, according to one aspect of the present invention, since a plurality of battery accommodating parts are formed with a common conductor sheet, the assembled battery is more excellent in terms of the mechanical strength as compared with an assembled battery comprising a plurality of package containers individually packaging unit batteries. For example, in the case where a tensile force in a width direction of the conductor sheet, a shearing force in a length direction of the adhesive part, or a shearing force in a thickness direction of the conductor sheet is added, or the like, damage hardly occurs. Additionally, since one aspect of the present invention has a plurality of cylindrical parts which are continuously formed with a common conductor sheet, durability to a compressive force in a length direction of the adhesive part can be enhanced.

Therefore, according to one aspect of the present invention, miniaturization and light weighting of the assembled battery can be attained, and moreover, sufficient durability can be imparted to the assembled battery.

Additionally, since one aspect of the present invention has a simple structure, it can be configured into plural steps without complicating a structure. For that reason, an assembled battery in which a plurality of unit batteries are connected not only in parallel but also in series can be constituted. Hence, a variety of assembled batteries in which battery capacity, voltage, and the like are in conformity with intended use can be provided.

DETAILED DESCRIPTION OF THE INVENTION

The present invention will be illustrated below based on preferred embodiments.

[Battery Package]

Figure 1:
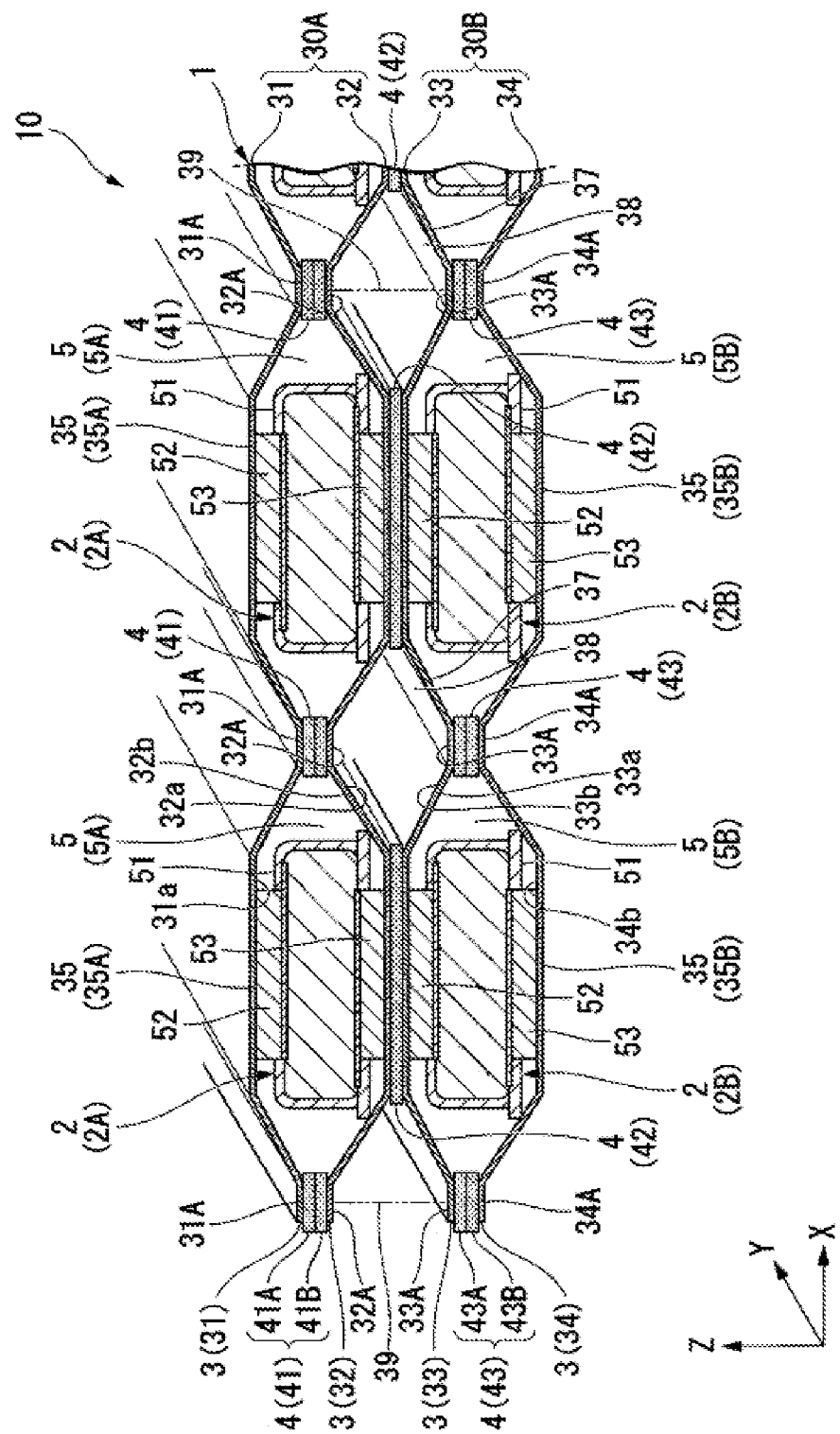
FIG. 1 is a sectional view schematically showing an example of an assembled battery comprising a battery package of an embodiment.
Figure 2:
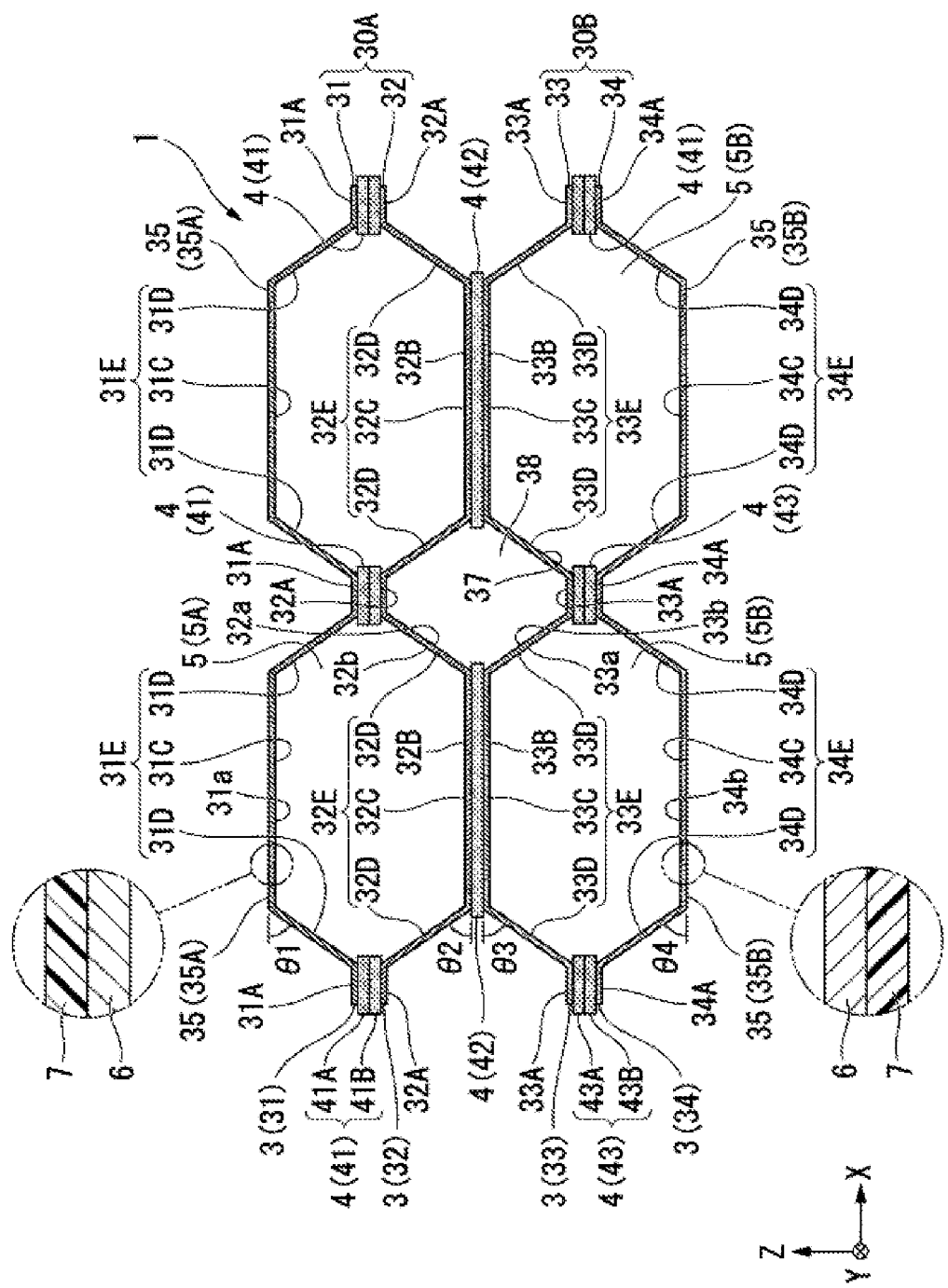
FIG. 2 is a sectional view schematically showing a battery package used in an assembled battery of FIG. 1.

FIG. 1 is a sectional view schematically showing an assembled battery 10 which is one example of an assembled battery comprising a battery package 1 of an embodiment. FIG. 2 is a sectional view schematically showing a battery package 1.

The assembled battery 10 is provided with a battery package 1 and a plurality of unit batteries 2.

The battery package 1 is provided with a plurality of conductor sheets 3. The battery package 1 shown in FIG. 1 and FIG. 2 is provided with, for example, four conductor sheets 3 which are arranged in an overlapping direction. These four conductor sheets 3 are also referred to as, in order from the top, first to fourth conductor sheets 31, 32, 33, 34, respectively.

As shown in FIG. 2, the conductor sheet 3 (31, 32, 33, 34) is formed of a laminate in which a metal layer 6 and a resin layer 7 are laminated, and has flexibility.

In the conductor sheet 3, the metal layer 6 is a necessary feature for securing electrically conductive performance. The conductor sheet 3 may be composed only of the metal layer 6, but it is preferable that it has a resin layer 7 for securing the insulation property.

Examples of a metal constituting the metal layer 6 include aluminum, copper, stainless steel, nickel, iron, and an alloy containing one or more of them. The metal layer 6 is, for example, formed of a metal foil containing one or more kinds selected from the group consisting of aluminum, copper, stainless steel, nickel, and iron. The metal may be carbon steel which is an iron alloy. Particularly, aluminum foil, copper foil, and stainless-steel foil are preferable, from a view point of workability, easy availability, the cost, the strength (piercing strength, tensile strength, and the like), corrosion resistance, and the like.

The metal layer 6 may have a structure having a substrate metal layer, and a plated layer formed on a surface thereof. The substrate metal layer and the plated layer are composed of, for example, the above-mentioned metals.

The stainless-steel foil is composed of, for example, stainless steel such as austenitic-based, ferritic-based, and martensitic-based stainless steels. As the austenitic based stainless steel, there are SUS304, 316, 301, and the like, as the ferritic-based stainless steel, there are SUS430 and the like, and as the martensitic-based stainless steel, there are SUS410 and the like.

The metal layer 6 has the function of reducing liquid leakage, for example, from a battery accommodating part 5.

A thickness of the metal layer 6 is preferably 1 mm or less, further preferably 500 µm or less, and most preferably 200 µm or less, from a view point of enhancement of workability of the conductor sheet 3. A thickness of the metal layer 6 is preferably 5 µm or more, further preferably 20 µm or more, and most preferably 40 µm or more, from a view point of enhancement of the mechanical strength of the conductor sheet 3. Additionally, an upper limit value and a lower limit value in a numerical vale range can be arbitrarily combined.

When a metal layer which is softened by annealing (annealed aluminum material) is used as the metal layer 6, flexible performance becomes good, and it becomes easy to make the conductor sheet 3 have a shape described later.

The resin layer 7 is composed of, for example, one or more kinds of polyolefin resins such as stretched polypropylene (OPP); polyester resins such as polyethylene terephthalate (PET), polyethylene naphthalate (PEN), and polybutylene terephthalate (PBT); polyamide resins such as nylon (Ny); polyimide resins; fluorine resins; acrylic resins; thermosetting resin-based paints (thermosetting resins); polyurethane resins; and the like. Among them, OPP and the thermosetting resin-based paints are preferable, from a view point of durability.

A thickness of the resin layer 7 is preferably 200 µm or less, further preferably 100 µm or less, and most preferably 50 µm or less, from a view point of enhancement of workability of the conductor sheet 3. A thickness of the resin layer 7 is preferably 1 µm or more, and further preferably 10 µm or more, from a view point of enhancement of the mechanical strength of the conductor sheet 3.

The resin layer 7 may be of a monolayer structure or a multilayer structure. Examples of the resin layer 7 having a multilayer structure comprise a bilayer film in which a PET film and a biaxially stretched polyamide resin film (ONy) are laminated. Additionally, the resin layer 7 may be of a multilayer structure of three or more layers.

A desired color or a desired design may be imparted to the resin layer 7, by containing a coloring material such as a pigment.

The conductor sheet 3 has an attitude, with the metal layer 6 being directed to the battery accommodating part 5.

In FIG. 1 and FIG. 2, an X direction is a width direction of the conductor sheet 3. A Y direction is a direction orthogonal to the X direction in a plane along the conductor sheet 3 (for example, substrate part 31C). A Z direction is a direction orthogonal to the X direction and the Y direction, and is a direction of a thickness of the conductor sheet 3.

Among conductor sheets 31, 32, 33, 34, first and second conductor sheets 31, 32 are one pair of conductor sheets 3 which are arranged facing each other. Conductor sheets 31, 32 are referred to as a first set 30A of conductor sheets 3.

Third and fourth conductor sheets 33, 34 are one pair of conductor sheets 3 which are arranged facing each other. Conductor sheets 33, 34 are referred to as a second set 30B of conductor sheets 3. The first set 30A and the second set 30B adjoin in the thickness direction (Z direction).

The first conductor sheet 31 and the second conductor sheet 32 are partially adhered with a plurality of linear adhesive layers 4 (adhesive layer 41). The adhesive layer 41 is constituted by laminating an adhesive layer 41A formed on a lower surface 31a (counter surface) of the conductor sheet 31 and an adhesive layer 41B formed on an upper surface 32b (counter surface) of the conductor sheet 32.

Adhesive layers 41A, 41B are formed into, for example, a belt-like shape having a constant width along the Y direction. Adhesive layers 41A, 41B are made to have the same width, and are formed by overlapping them. A plurality of adhesive layers 41 are formed apart from each other in the X direction. It is preferable that the plurality of adhesive layers 41 are formed at a constant interval in the X direction.

Of the first conductor sheet 31, a part which is adhered to the second conductor sheet 32 with the adhesive layer 41 is referred to as adhesive part 31A. The adhesive part 31A is, for example, a belt-like part of a constant width along the Y direction. A plurality of adhesive parts 31A are formed apart from each other in the X direction. It is preferable that the plurality of adhesive parts 31A are formed at a constant interval in the X direction.

Of the second conductor sheet 32, a part which is adhered to the first conductor sheet 31 with the adhesive layer 41 is referred to as adhesive part 32A. The adhesive part 32A is, for example, a belt-like part of a constant width along the Y direction. A plurality of adhesive parts 32A are formed apart from each other in the X direction. It is preferable that the plurality of adhesive parts 32A are formed at a constant interval in the X direction.

The second conductor sheet 32 and the third conductor sheet 33 are partially adhered with a plurality of linear adhesive layers 42.

The adhesive layer 42 is formed between a lower surface 32a (counter surface) of the conductor sheet 32 and an upper surface 33b (counter surface) of the conductor sheet 33.

The adhesive layer 42 is formed into, for example, a belt-like shape of a constant width along the Y direction. A plurality of adhesive layers 42 are formed apart from each other in the X direction. It is preferable that the plurality of adhesive layers 42 are formed at a constant interval in the X direction.

Of the second conductor sheet 32, a part which is adhered to the third conductor sheet 33 with the adhesive layer 42 is referred to as adhesive part 32B. The adhesive part 32B is, for example, a belt-like part of a constant width along the Y direction. A plurality of adhesive parts 32B are formed apart from each other in the X direction. It is preferable that the plurality of adhesive parts 32B are formed at a constant interval in the X direction.

Of the third conductor sheet 33, a part which is adhered to the second conductor sheet 32 with the adhesive layer 42 is referred to as adhesive part 33B. The adhesive part 33B is, for example, a belt-like part of a constant width along the Y direction. A plurality of adhesive parts 33B are formed apart from each other in the X direction. It is preferable that the plurality of adhesive parts 33B are formed at a constant interval in the X direction.

In the second conductor sheet 32, the adhesive part 32A in which an upper surface 32b (first surface) is adhered to the first conductor sheet 31 and the adhesive part 32B in which a lower surface 32a (second surface) is adhered to the third conductor sheet 33 are alternately arranged in a width direction (X direction) of the second conductor sheet 32.

It is preferable that the adhesive part 32B is formed to be wider in width than the adhesive part 32A.

The third conductor sheet 33 and the fourth conductor sheet 34 are partially adhered with a plurality of linear adhesive layers 43.

The adhesive layer 43 is constituted by laminating an adhesive layer 43A formed on a lower surface 33a (counter surface) of the conductor sheet 33 and an adhesive layer 43B formed on an upper surface 34b (counter surface) of the conductor sheet 34.

Adhesive layers 43A, 43B are formed into, for example, a belt-like shape of a constant width along the Y direction. Adhesive layers 43A, 43B are made to have the same width, and are formed by overlapping them. A plurality of adhesive layers 43 are formed apart from each other in the X direction. It is preferable that the plurality of adhesive layers 43 are formed at a constant interval in the X direction.

Examples of an adhesive constituting the adhesive layers 41, 42, 43 include insulating materials such as a polyolefin-based adhesive, a urethane-based adhesive, an epoxy-based adhesive, an acrylic-based adhesive, a nylon-based adhesive, and a polyester based adhesive.

As the adhesive, a polyolefin-based adhesive composed of a polyolefin resin is preferable. Examples of the polyolefin resin include polyethylene, polypropylene, poly-1-butene, polyisobutylene, a copolymer of propylene and ethylene, a copolymer of propylene and an olefin-based monomer, and the like. Among them, from a view point of adhesiveness, durability, and the like, maleic anhydride-modified polypropylene is preferable. Additionally, it is preferable that a compound containing a plurality of epoxy groups is contained as a crosslinking agent. More specifically, an adhesive containing an acid modified polyolefin resin (for example, maleic anhydride-modified polypropylene) (A) and an epoxy resin-based compound (B) can be used. The adhesive containing an acid-modified polyolefin resin (A) and an epoxy resin-based compound (B) is preferable from a view point of the strength at adhesion, and a package having the high strength can be manufactured. The epoxy resin-based compound (B) is preferably, for example, a compound having two or more epoxy groups in one molecule, and an adhesive containing 1 to 30% of a bisphenol type phenol A type epoxy resin or a phenol novolak-modified epoxy resin is further preferable.

By using a polyolefin-based adhesive as the adhesive constituting the adhesive layers 41, 42, 43, the adhesion strength of the conductor sheet 3 can be enhanced, and the battery package 1 excellent in strength is obtained.

By inclusion of an acid-modified polyolefin resin and a crosslinking agent by the adhesive, the battery package 1 in which the adhesion strength of the conductor sheet 3 is high and durability is excellent can be manufactured.

Of the third conductor sheet 33, a part which is adhered to the fourth conductor sheet 34 with the adhesive layer 43 is referred to as adhesive part 33A. The adhesive part 33A is, for example, a belt-like part of a constant width along the Y direction. A plurality of adhesive parts 33A are formed apart from each other in the X direction. It is preferable that the plurality adhesive parts 33A are formed at a constant interval in the X direction.

Of the fourth conductor sheet 34, a part which is adhered to the third conductor sheet 33 with the adhesive layer 43 is referred to as adhesive part 34A. The adhesive part 34A is, for example, a belt-like part of a constant width along the Y direction. A plurality of adhesive parts 34A are formed apart from each other in the X direction. It is preferable that the plurality of adhesive parts 34A are formed at a constant interval in the X direction.

In the third conductor sheet 33, the adhesive part 33A in which a lower surface 33a (first surface) is adhered to the fourth conductor sheet 34 and the adhesive part 33B in which an upper surface 33b (second surface) is adhered to the second conductor sheet 32 are alternately arranged in a width direction (X direction) of the third conductor sheet 33.

It is preferable that the adhesive part 33B is formed to be wider in width than the adhesive part 33A.

As shown in FIG. 2, a part between adhesive parts 31A, 31A of the first conductor sheet 31 adjoining in the X direction is referred to as intermediate part 31E (non-adhesive part). The intermediate part 31E has a substrate part 31C and one pair of side plate parts 31D, 31D inclined to the substrate part 31C. The substrate part 31C faces one surface (upper surface of FIG. 1) of a unit battery 2 (2A) in the battery accommodating part 5 (5A).

Side plate parts 31D, 31D extend from both side edges of the substrate part 31C toward adhesive parts 31A, 31A, respectively. Side plate parts 31D, 31D extend inclined so as to gradually approach the second conductor sheet 32 (conductor sheet 3 on an opposite side) in a widening direction from both side edges of the substrate part 31C. As side plate parts 31D, 31D approach the second conductor sheet 32, they move away from each other.

The intermediate part 31E has a bending shape that is convexed outward in a direction away from the second conductor sheet 32 (outwardly), relative to a plane passing through the adjacent adhesive parts 31A, 31A.

The adhesive part 32B of the second conductor sheet 32 is also referred to as substrate part 32C. The substrate part 32C faces the other surface (lower surface of FIG. 1) of the unit battery 2 (2A) in the battery accommodating part 5 (5A). The substrate part 31C of the conductor sheet 31 and the substrate part 32C of the conductor sheet 32 stay away in the thickness direction (Z direction).

Of the second conductor sheet 32, parts extending from both side edges of the substrate part 32C toward adhesive parts 32A, 32A, respectively, are referred to as side plate parts 32D, 32D. Side plate parts 32D, 32D extend inclined so as to gradually approach the first conductor sheet 31 (conductor sheet 3 on an opposite side) in a widening direction from both side edges of the substrate part 32C. As side plate parts 32D, 32D approach the first conductor sheet 31, they move away from each other.

A part containing the substrate part 32C and one pair of side plate parts 32D, 32D, of the second conductor sheet 32, is referred to as intermediate part 32E (non-adhesive part). The intermediate part 32E is a part between adhesive parts 32A, 32A adjoining in the X direction.

The intermediate part 32E has the substrate part 32C and side plate parts 32D, 32D inclined to the substrate part 32C. The intermediate part 32E has a bending shape that is convexed outward in a direction away from the first conductor sheet 31 (outwardly) relative to a plane passing through adjacent adhesive parts 32A, 32A.

Side plate parts 31D, 31D of the intermediate part 31E of the first conductor sheet 31 approach the second conductor sheet 32 toward a widening direction, and side plate parts 32D, 32D of the intermediate part 32E of the second conductor sheet 32 approach the first conductor sheet 31 toward a widening direction. For that reason, the cylindrical part 35 (35A) has a hexagonal tubular shape composed of substrate parts 31C, 32C and side plate parts 31D, 31D, 32D, 32D.

When one intermediate part has a substrate part, and one pair of side plate parts inclined so as to approach a conductor sheet on an opposite side toward a widening direction, and the other intermediate part has a substrate part, and one pair of side plate parts inclined so as to approach a conductor sheet on an opposite side toward a widening direction, a shape composed of these substrate parts and side plate parts can be called hexagonal tubular shape.

It is desirable that intermediate parts 31E, 32E of conductor sheets 31, 32 have a small difference in a width dimension. For example, it is preferable that the difference in a width dimension between intermediate parts 31E, 32E is 10% or less to a greater dimension of width dimensions of intermediate parts 31E, 32E.

It is preferable that a width dimension of the intermediate part 31E of the conductor sheet 31 and a width dimension of the intermediate part 32E of the conductor sheet 32 are equal.

A width dimension of the intermediate part 31E is a total of a width dimension of the substrate part 31C and a width dimension of side plate parts 31D, 31D. A width dimension of the intermediate part 32E is a total of a width dimension of the substrate part 32C and a width dimension of side plate parts 32D, 32D.

A width dimension of substrate parts 31C, 32C is a dimension in a direction along substrate parts 31C, 32C and orthogonal to adhesive parts 31A, 32A. A width dimension of side plate parts 31D, 32D is a dimension in a direction along side plate parts 31D, 32D and orthogonal to adhesive parts 31A, 32A.

The adhesive part 33B of the third conductor sheet 33 is also referred to as substrate part 33C. The substrate part 33C faces one surface (upper surface of FIG. 1) of the unit battery 2 (2B) in the battery accommodating part 5 (5B).

Of the third conductor sheet 33, parts extending from both side edges of the substrate part 33C toward adhesive parts 33A, 33A, respectively, are referred to as side plate parts 33D, 33D. Side plate parts 33D, 33D extend inclined so as to gradually approach the fourth conductor sheet 34 (conductor sheet 3 on an opposite side) from both side edges of the substrate part 33C in a widening direction. As side plate parts 33D, 33D approach the fourth conductor sheet 34, they move away from each other.

A part containing the substrate part 33C and one pair of side plate parts 33D, 33D, of the third conductor sheet 33, is referred to as intermediate part 33E (non-adhesive part). The intermediate part 33E is a part between adhesive parts 33A, 33A adjoining in the X direction.

The intermediate part 33E has the substrate part 33C and side plate parts 33D, 33D inclined to the substrate part 33C. The intermediate part 33E has a bending shape that is convexed outward in a direction away from the fourth conductor sheet 34 (outwardly), relative to a plane passing through adjacent adhesive parts 33A, 33A.

A part between adhesive parts 34A, 34A of the fourth conductor sheet 34 adjoining in the X direction is referred to as intermediate part 34E (non-adhesive part). The intermediate part 34E has the substrate part 34C and one pair of side plate parts 34D, 34D inclined to the substrate part 34C. The substrate part 34C faces one surface (lower surface of FIG. 1) of the unit battery 2 (2B) in the battery accommodating part 5 (5B). The substrate part 34C of the conductor sheet 33 and the substrate part 34C of the conductor sheet 34 stay away in the thickness direction (Z direction).

Side plate parts 34D, 34D extend from both side edges of the substrate part 34C toward adhesive parts 34A, 34A, respectively. Side plate parts 34D, 34D extend inclined so as to gradually approach the third conductor sheet 33 (conductor sheet 3 on an opposite side) from both side edges of the substrate part 34C in a widening direction. As side plate parts 33D, 33D approach the third conductor sheet 33, they move away from each other.

The intermediate part 34E has a bending shape that is convexed outward in a direction away from the third conductor sheet 33 (outwardly), relative to a plane passing through adjacent adhesive parts 34A, 34A.

In FIG. 2, substrate parts 31C, 32C, 33C, 34C are formed along an XY plane.

Side plate parts 33D, 33D of the intermediate part 33E of the third conductor sheet 33 approach the fourth conductor sheet 34 toward a widening direction, and side plate parts 34D, 34D of the intermediate part 34E of the fourth conductor sheet 34 approach the third conductor sheet 33 toward a widening direction. For that reason, the cylindrical part 35 (35B) has a hexagonal tubular shape composed of substrate parts 33C, 34C and side plate parts 33D, 33D, 34D, 34D.

It is desirable that intermediate parts 33E, 34E of conductor sheets 33, 34 have a small difference in a width dimension. For example, it is preferable that the difference in a width dimension between intermediate parts 33E, 34E is 10% or less to a greater dimension of width dimensions of intermediate parts 33E, 34E.

It is preferable that a width dimension of the intermediate part 33E of the conductor sheet 33 and a width dimension of the intermediate part 34E of the conductor sheet 34 are equal.

A width dimension of the intermediate part 33E is a total of a width dimension of the substrate part 33C and a width dimension of side plate parts 33D, 33D. A width dimension of the intermediate part 34E is a total of a width dimension of the substrate part 34C and a width dimension of side plate parts 34D, 34D.

A width dimension of substrate parts 33C, 34C is a dimension in a direction along substrate parts 33C, 34C and orthogonal to adhesive parts 33A, 34A. A width dimension of side plate parts 33D, 34D is a dimension in a direction along side plate parts 33D, 34D and orthogonal to adhesive parts 33A, 34A.

The intermediate part 31E (substrate part 31C and side plate parts 31D, 31D) of the first conductor sheet 31 and the intermediate part 32E (substrate part 32C and side plate parts 32D, 32D) of the second conductor sheet 32 form a hollow polygonal tubular cylindrical part 35 (35A). An interior space of the cylindrical part 35 (35A) is a battery accommodating part 5 (5A). The cylindrical part 35 (35A) is partitioned with adhesive parts 31A, 32A.

Side plate parts 31D, 31D have a flat shape in which an XZ cross section is linear, and are inclined at an angle $\theta 1$ ($0° < \theta 1 < 90°$) to the substrate part 31C. Side plate parts 32D, 32D have a flat shape in which an XZ cross section is linear, and are inclined at an angle $\theta 2$ ($0° < \theta 2 < 90°$) to the substrate part 32C.

Both of conductor sheets 31, 32 are continuously formed in a width direction over a plurality of cylindrical parts 35 (35A).

The intermediate part 33E (substrate part 33C and side plate parts 33D, 33D) of the third conductor sheet 33 and the intermediate part 34E (substrate part 34C and side plate parts 34D, 34D) of the fourth conductor sheet 34 form a hollow polygonal tubular cylindrical part 35 (35B). An interior space of the cylindrical part 35 (35B) is the battery accommodating part 5 (5B). The cylindrical part 35 (35B) is partitioned with adhesive parts 33A, 34A.

Side plate parts 33D, 33D have a flat shape in which an XZ cross section is linear, and are inclined at an angle θ3 (0°<θ3<90°) to the substrate part 33C. Side plate parts 34D, 34D have a flat shape in which an XZ cross section is linear, and are inclined at an angle θ4 (0°<θ4<90°) to the substrate part 34C.

The angle θ3 may be the same as the angle θ1. The angle θ4 may be the same as the angle θ2. The angles θ1 to θ4 may be the same angle.

Both of conductor sheets 33, 34 are continuously formed in a width direction over a plurality of cylindrical parts 35 (35B).

Since the cylindrical part 35 has a hexagonal tubular shape having flat side plate parts 31D, 32D, 33D, 34D, this is a particularly preferable configuration in point of the strength of the assembled battery 10.

Side plate parts 32D, 32D and the adhesive part 32A of the second conductor sheet 32, and side plate parts 33D, 33D and the adhesive part 33A of the third conductor sheet 33 form a plurality of hollow polygonal tubular (hexagonal tubular in FIG. 1) cylindrical parts 37.

Since the adhesive part 32A is narrowed as compared with the adhesive part 32B, and the adhesive part 33A is formed narrower as compared with the adhesive part 33B, an interior space 38 of the cylindrical part 37 has a smaller width dimension than that of the battery accommodating part 5 which is an interior space of the cylindrical part 35.

The interior space 38 of the cylindrical part 37 is a space which is secured between the first set 30A and the second set 30B. A heat medium (for example, cooling water, air for cooling or the like) which was supplied by a feed mechanism not shown can be passed though the interior space 38. Thereby, a temperature of the assembled battery 10 can be adjusted.

In the battery package 1, a plurality of cylindrical parts 35 are arranged in parallel in a width direction (X direction) of the conductor sheet 3. Additionally, cylindrical parts 37 are also arranged in parallel in a width direction (X direction) of the conductor sheet 3. The battery package 1 has a honeycomb structure in which a plurality of cylindrical parts 35 are arranged regularly.

One pair of conductor sheets 3, 3 facing each other of the battery package 1 have two or more cylindrical parts 35. For example, in the battery package 1 shown in FIG. 1, conductor sheets 31, 32 have two or more cylindrical parts 35 lining up in a width direction (X direction). The number of cylindrical parts which are formed by one pair of conductor sheets facing each other is preferably 3 or more, and can be, for example, 4 to 10.

Since the battery package 1 has two or more cylindrical parts 35, the assembled battery 10 having two or more unit batteries 2 which are connected in parallel is obtained. The number of the unit batteries 2 is preferably 3 or more, and is, for example, 4 to 10.

Since the battery package 1 can constitute the assembled battery 10 in which two or more unit batteries 2 are arranged in parallel, this is preferable from a view point of electric power supply.

It is preferable that the battery package 1 has two or more sets of conductor sheets 3, 3 facing each other. For example, the battery package 1 shown in FIG. 1 has two sets (first set 30A and second set 30B) of conductor sheets 3. The number of conductor sheets 3, 3 facing each other (number of sets) is preferably 3 or more sets, and can be, for example, 4 to 20 sets.

When the battery package 1 has two or more sets of conductor sheets 3, 3, the assembled battery 10 in which two or more unit batteries 2 are arranged in series is obtained. The number of the unit batteries 2 to be connected in series is preferably 3 or more, and is, for example, 4 to 20.

Since the battery package 1 having two or more sets of conductor sheets 3, 3 can constitute the assembled battery 10 in which two or more unit batteries 2 are arranged in series, this is preferable from a view point of electric power supply.

As a structure for sealing an opening of the cylindrical part 35, a lid body which is a bilayer body composed of an open cell expanded resin sheet and a closed cell expanded resin sheet can be used. For example, by press-inserting the lid body in which the above mentioned open cell expanded resin sheet was impregnated with an adhesive (for example, polyolefin-based adhesive) having electrolytic solution resistance, into the cylindrical part 35, an opening of the cylindrical part 35 can be sealed.

In order to impart the waterproof property to the assembled battery, a barrier material such as a metal foil can be provided on a surface layer of the lid body. The barrier material is provided so as not to generate a short circuit in the assembled battery. In addition, a structure for sealing the opening of the cylindrical part is not limited to this.

At least one of a plurality of adhesive parts 32A of the second conductor sheet 32 is electrically connected to at least one of adhesive parts 33A of the third conductor sheet 33 with a connecting part 39 interposed between the adhesive part 32A and the adhesive part 33A.

As shown in FIG. 1, the unit battery 2 is, for example, a lithium ion battery, and is provided with a battery body 51, a positive electrode terminal plate 52, and a negative electrode terminal plate 53. Since the unit battery 2 is accommodated in the cylindrical part 35, it is packaged in the battery package 1.

In addition, the battery to be accommodated in the cylindrical part 35 may not be a unit battery 2 which can be taken in/out, and for example, a battery may be constituted in the battery accommodating part 5, by providing a positive electrode active material layer, a negative electrode active material layer, and a separator isolating them, in the cylindrical part 35, and at the same time, filling an electrolyte (electrolytic solution) therein.

Figure 3:
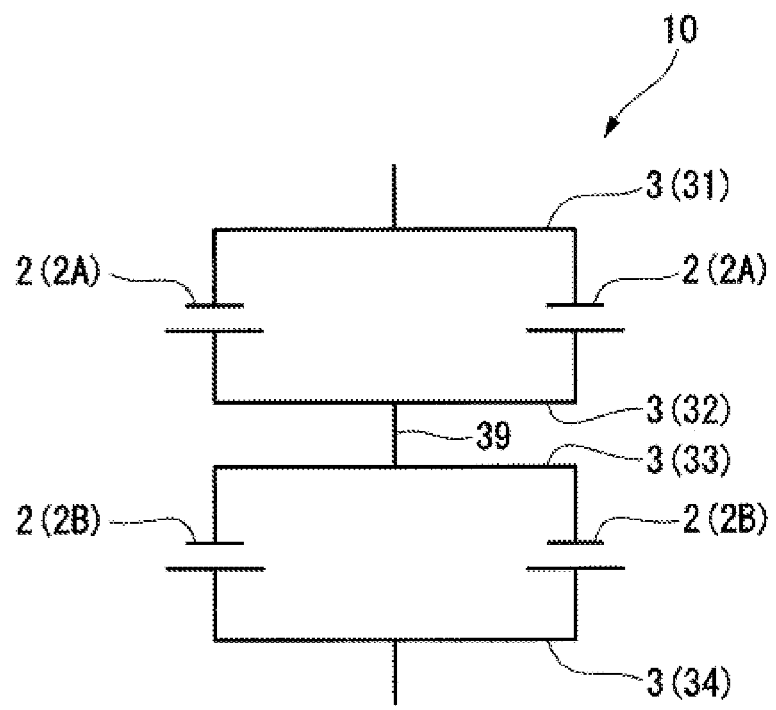
FIG. 3 is a circuit view of an assembled battery of FIG. 1.

FIG. 3 is a circuit view of an assembled battery 10.

As shown in FIG. 3, a plurality of unit batteries 2A, 2A are connected in parallel with conductor sheets 31, 32. A plurality of unit batteries 2B, 2B are connected in parallel with conductor sheets 33, 34.

Unit batteries 2A, 2A and unit batteries 2B, 2B are connected in series with the connecting part 39.

[Method of Manufacturing Battery Package]

Then, one example of a method of manufacturing the battery package 1 will be illustrated.

(First Step: Adhering Step)

Figure 4:
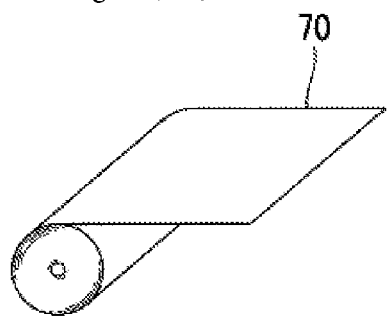
FIGS. 4A-4D are explanatory views showing steps of manufacturing an assembled battery of FIG. 1.
Figure 4:
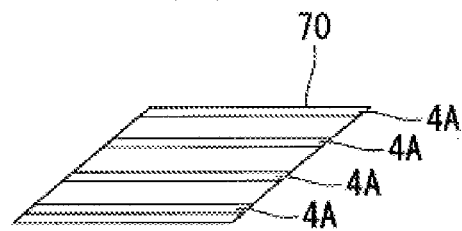
Figure 4:
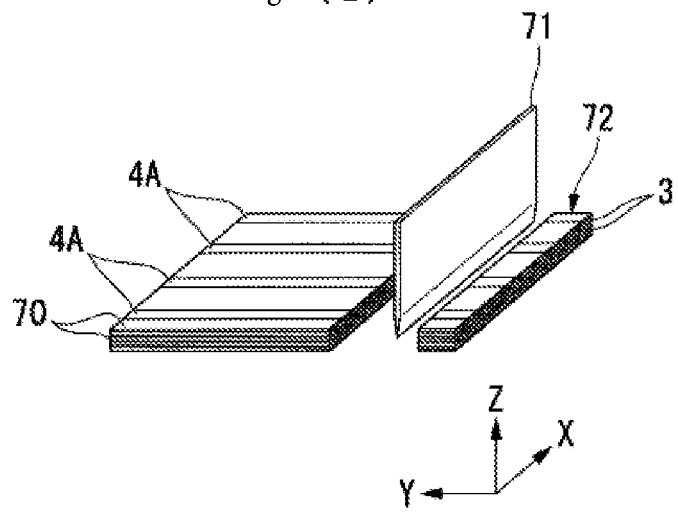
Figure 4:
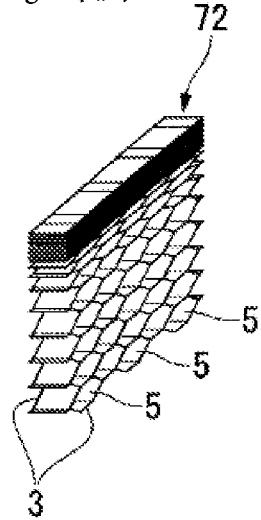

As shown in FIG. 4 (A), a long conductor sheet 70 is prepared.

As shown in FIG. 4 (B), an adhesive 4A is coated on a conductor sheet 70 linearly.

As shown in FIG. 4 (C), a plurality of conductor sheets 70 are overlapped and adhered with the adhesive 4A.

(Second Step: Cutting Step)

As shown in FIG. 4 (C), a plurality of conductor sheets 70 are cut into a predetermined Y directional dimension using a cutter 71. Thereby, a battery package 72 composed of a plurality of conductor sheets 3 which are adhered with an adhesive layer composed of the adhesive 4A is obtained.

(Third Step: Spreading Step)

As shown in FIG. 4 (D), a plurality of conductor sheets 3 of the battery package 72 are spread, and a battery accommodating part 5 is formed (see FIG. 2).

Figure 5:
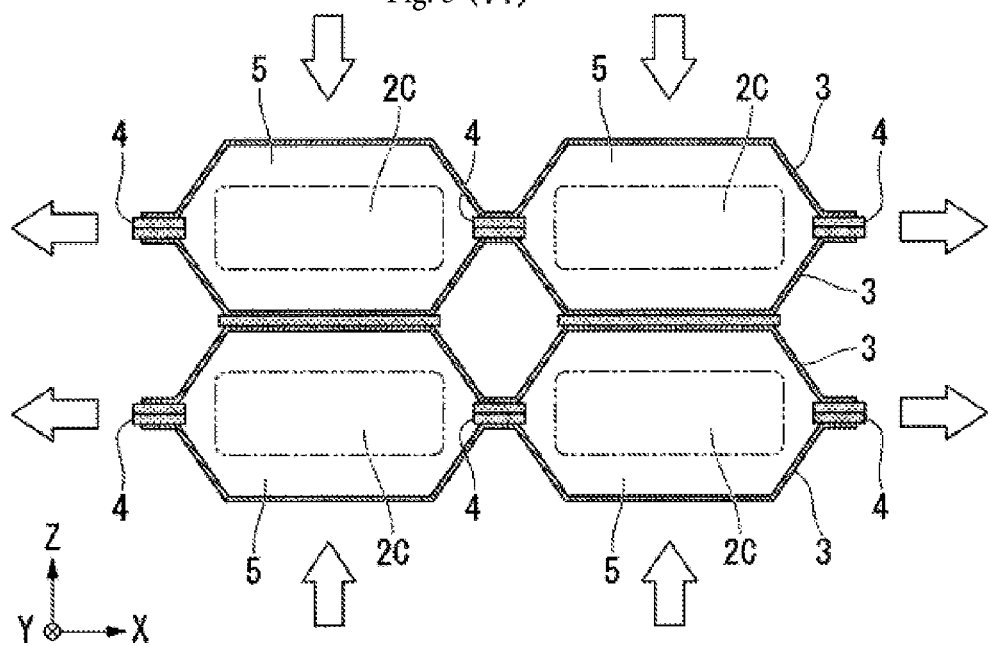
FIGS. 5A and 5B are explanatory views showing a manufacturing step continuing from FIG. 4.
Figure 5:
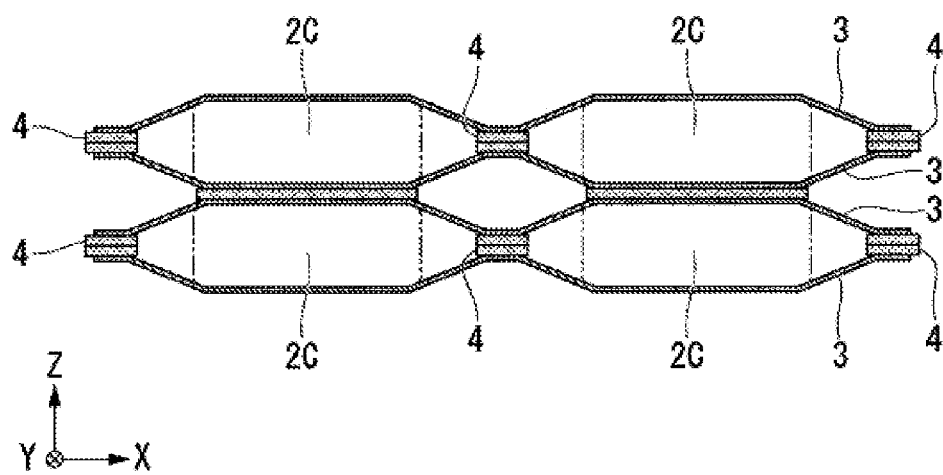

As shown in FIG. 5 (A), by accommodating the unit battery 2 into the battery accommodating part 5, and adding a tensile force in the width direction (X direction) to the battery package 1, or adding a compressive force in the thickness direction (Z direction) thereto, a thickness of the battery accommodating part 5 is adjusted, and the conductor sheet 3 is brought into the state where it is contacted with the unit battery 2, as shown in FIG. 5 (B).

Thereby, the assembled battery 10 shown in FIG. 1 is obtained.

Since in the battery package 1, a plurality of battery accommodating parts 5 are formed with a common conductor sheet 3, for example, a part such as a connecting structure can be omitted as compared with a plurality of package containers individually packaging unit batteries, and therefore, a structure of the assembled battery can be simplified. For that reason, miniaturization and light weighting of the assembled battery 10 can be attained.

Additionally, since in the battery package 1, a plurality of battery accommodating parts 5 are formed with a common conductor sheet 3, this is excellent in the mechanical strength as compared with a plurality of package containers individually packaging unit batteries. For example, when a tensile force in the width direction (X direction) of the conductor sheet 3, a shearing force in the length direction (Y direction) of the adhesive part, or a shearing force in the thickness direction (Z direction) of the conductor sheet 3 is added, damage hardly occurs. Additionally, since the battery package 1 has a plurality of cylindrical parts 35 which are continuously formed with a common conductor sheet 3, durability to a compressive force in the length direction (Y direction) of the adhesive part can be enhanced.

Therefore, the battery package 1 can attain miniaturization and light weighting of the assembled battery 10, and moreover, can impart sufficient durability to the assembled battery 10.

Since the assembled battery 10 comprising the battery package 1 becomes small and light, it can also be applied to such intended use that an installation space is limited and such intended use that a weight easily becomes a problem. For example, the assembled battery can be suitably used as the battery for cars, homes or the like.

Since the battery package 1 has a simple structure, it can be configured into plural steps (structure having a plurality of sets of conductor sheets 3) without complicating a structure. For that reason, the assembled battery 10 in which a plurality of unit batteries 2 are connected not only in parallel but also in series can be configured. Hence, a variety of assembled batteries 10 in which battery capacity, voltage, and the like are in conformity with application purpose can be provided.

Figure 11:
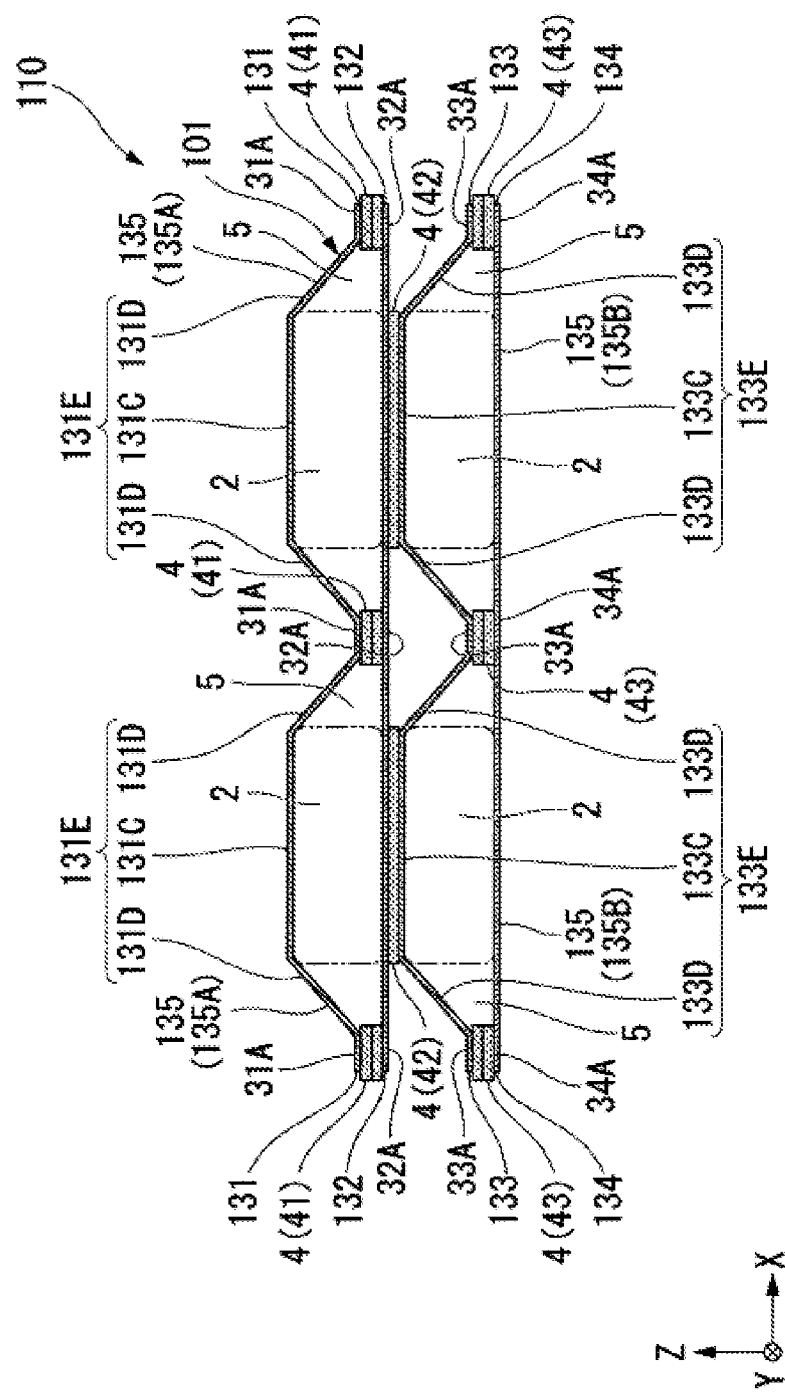
FIG. 11 is a sectional view schematically showing an assembled battery using an example of a battery package.

Since the battery package 1 has a bending shape that intermediate parts 31E, 32E, 33E, 34E of conductor sheets 31, 32, 33, 34 each are convexed outward, a difference in a width dimension between intermediate parts of conductor sheets facing each other becomes smaller, as compared with a battery package in which one of conductor sheets facing each other is flat (see FIG. 11). For that reason, a dimension in the thickness direction (Z direction) can be easily adjusted. Hence, by adding a compressive force in the thickness direction to conductor sheets 3 to displace in a mutually approaching direction, a distance between electrode plates can be reduced in the unit battery 2. Therefore, the energy efficiency can be enhanced, and performance of the assembled battery 10 as the battery can be enhanced.

Additionally, by adding a compressive force in the thickness direction to the battery package 1, the conductor sheet 3 can be assuredly contacted with the positive electrode terminal plate 52 and the negative electrode terminal plate 53 of the unit battery 2 to secure sufficient conduction.

In order to add a compressive force to the battery package 1, a structure in which a pressing material having elasticity (not shown) is provided on at least one of the thickness direction (Z direction) of the battery package 1 is possible.

Since a difference in a width dimension between intermediate parts of conductor sheets facing each other can be reduced, the battery package 1 can be easily prepared using a plurality of overlapped flat conductor sheets 70, as shown in FIG. 4 (A) to FIG. 4 (D).

Since in the battery package 1, the cylindrical part 35 is made to have a hexagonal tubular shape, the strength to a tensile force in the width direction (X direction) of the conductor sheet 3, a shearing force in the length direction (Y direction) of the adhesive part, or a shearing force in the thickness direction (Z direction) of the conductor sheet 3 can be enhanced. In addition, since the cylindrical part 35 is made to have a hexagonal tubular shape, a sufficient volume can be secured in the cylindrical part 35.

Since in the battery package 1, an interior space 38 is secured between the second conductor sheet 32 and the third conductor sheet 33, a temperature of the assembled battery 10 can be adjusted by passing a heat medium (cooling water, air for cooling or the like) through the interior space 38.

Since the interior space 38 is adjacent to the battery accommodating part 5, a temperature of the unit battery 2 in the battery accommodating part 5 can be effectively adjusted.

Since in the battery package 1, adhesive parts 32A, 33A and adhesive parts 32B, 33B are alternately arranged in the width direction (X direction) in conductor sheets 32, 33, a structure becomes a honeycomb structure in which a plurality of cylindrical parts 35 are arranged in parallel in the width direction (X direction). For that reason, as described above, miniaturization and light weighting of the assembled battery 10 can be attained.

Since in the battery package 1, adhesive parts 32B, 33B of conductor sheets 32, 33 are to be wider in width than adhesive parts 32A, 33A, a sufficient width can be secured in the battery accommodating part 5 which is an interior space of the cylindrical part 35. Hence, unit batteries 2 can be densely arranged, and miniaturization of the assembled battery 10 can be attained.

Since in the battery package 1, conductor sheets 3 have flexibility, such displacement that they mutually approach in the thickness direction (Z direction) in the cylindrical part 35 becomes easy. Hence, as described above, performance of the assembled battery 10 as the battery can be enhanced.

Then, a modified example of the battery package 1 will be illustrated. Hereinafter, concerning the same features as those of the battery package 1 shown in FIG. 1 and FIG. 2, the same symbol is added, and illustration is omitted in some cases.

Figure 6:
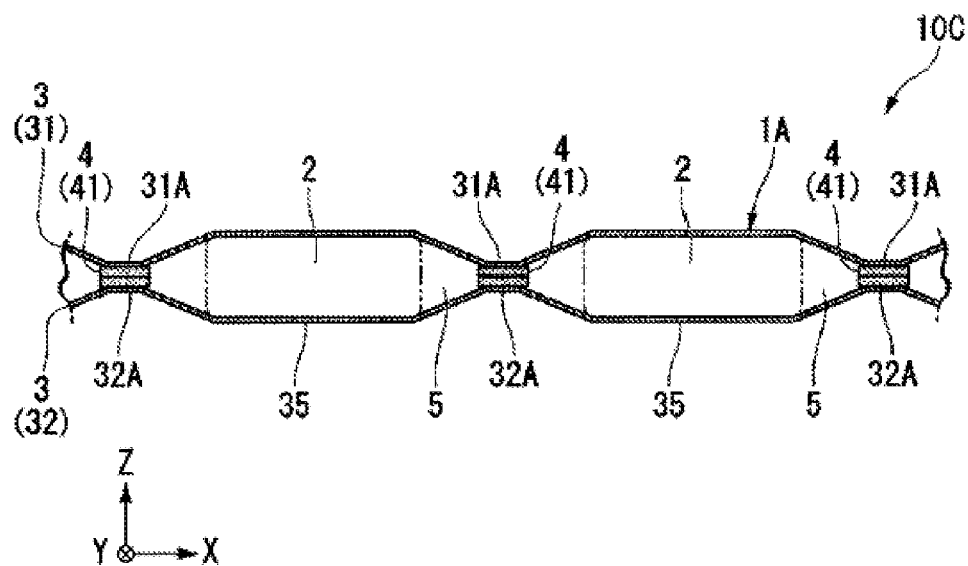
FIG. 6 is a sectional view schematically showing an example of an assembled battery using a first modified example of a battery package of an embodiment.

FIG. 6 is a sectional view schematically showing an assembled battery 10C comprising a battery package 1A which is a first modified example of the battery package 1.

The battery package 1A has the same structure as that of the battery package 1 shown in FIG. 1 and FIG. 2 except that there are no conductor sheets 33, 34, and only one pair of conductor sheets 3 (31, 32) is used.

Figure 7:
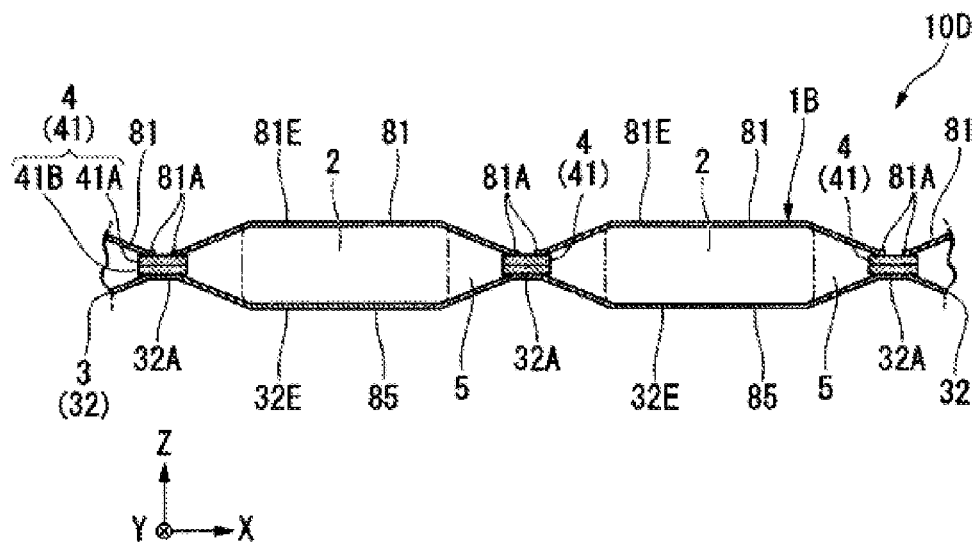
FIG. 7 is a sectional view schematically showing an example of an assembled battery using a second modified example of a battery package of an embodiment.

FIG. 7 is a sectional view schematically showing an assembled battery 10D comprising a battery package 1B which is a third modified example of the battery package 1.

The battery package 1B has the same structure as that of the battery package 1A shown in FIG. 6 except that in place of the first conductor sheet 31, a plurality of conductor sheets 81 which line up in the width direction (X direction) are used.

The conductor sheet 81 is made to have, for example, a belt-like shape of a constant width along a Y direction.

The conductor sheet 81 is adhered to an adhesive part 32A of the second conductor sheet 32 with an adhesive layer 41 at the adhesive part 81A which is a part containing both side edges.

A part between adhesive parts 81A, 81A of the first conductor sheet 81 (intermediate part 81E) and an intermediate part 32E of the second conductor sheet 32 form a cylindrical part 85.

Figure 8:
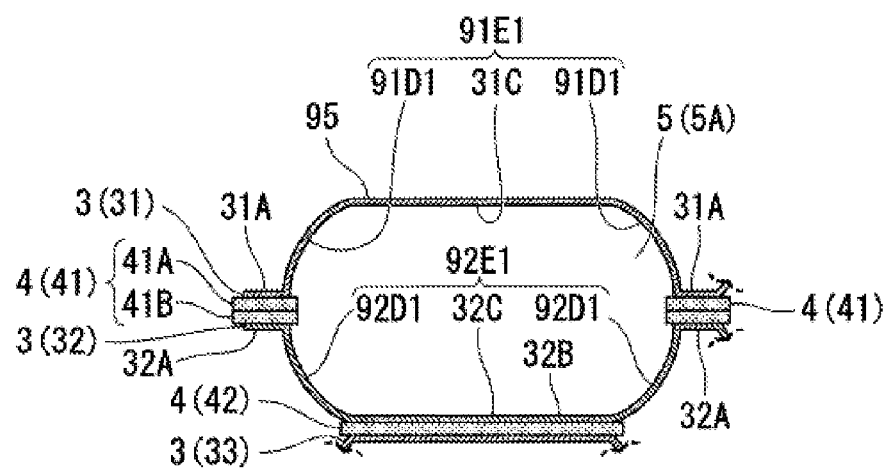
FIG. 8 is a sectional view schematically showing a first modified example of a cylindrical part of a battery package of an embodiment.

FIG. 8 is a sectional view showing a cylindrical part 95 which is a first modified example of the cylindrical part 35. An intermediate part 91E1 of a first conductor sheet 31 has a substrate part 31C, and one pair of side plate parts 91D1, 91D1.

Side plate parts 91D1, 91D1 are made to have a curved shape (for example, arched cross section) that is convexed toward the outside of the cylindrical part 95, and extend inclined so as to gradually approach a second conductor sheet 32 in a widening direction from both side edges of the substrate part 31C. The intermediate part 91E1 has a bending shape that is convexed outward in a direction away from the second conductor sheet 32 (outwardly).

The intermediate part 92E1 of the second conductor sheet 32 has a substrate part 32C and one pair of side plate parts 92D1, 92D1. Side plate parts 92D1, 92D1 are made to have a curved shape that is convexed toward the outside of the cylindrical part 95 (for example, arched cross section), and extend inclined so as to gradually approach the first conductor sheet 31 in a widening direction from both side edges of the substrate part 32C. The intermediate part 92E1 is made to have a bending shape that is convexed outward in a direction away from the first conductor sheet 31 (outwardly).

Intermediate parts 91E1, 92E1 of conductor sheets 31, 32 form the cylindrical part 95. The cylindrical part 95 has a configuration which is preferable when one wants to enlarge a battery accommodating part 5 to increase the volume ratio of the battery in the assembled battery.

Figure 9:
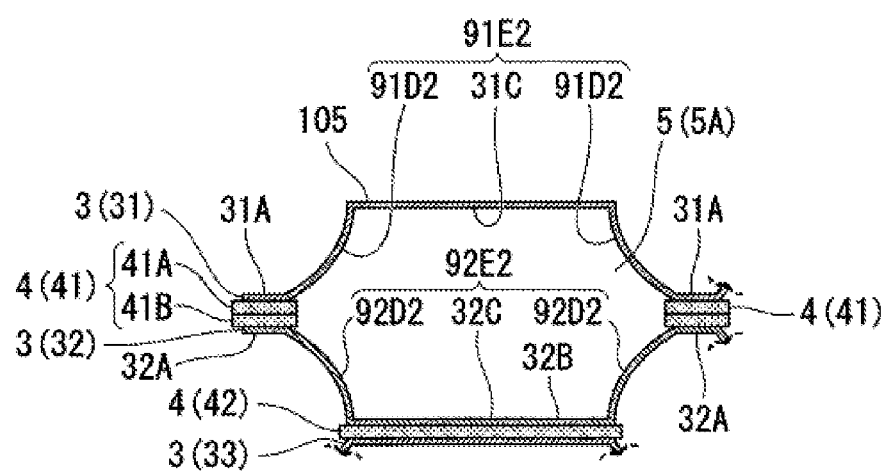
FIG. 9 is a sectional view schematically showing a second modified example of a cylindrical part of a battery package of an embodiment.

FIG. 9 is a sectional view showing a cylindrical part 105 which is a second modified example of the cylindrical part 35.

An intermediate part 91E2 of a first conductor sheet 31 has a substrate part 31C and one pair of side plate parts 91D2, 91D2. Side plate parts 91D2, 91D2 are made to have a curved shape that is convexed toward the inside of the cylindrical part 105 (for example, arched cross section), and extend inclined so as to gradually approach a second conductor sheet 32 in a widening direction from both side edges of the substrate part 31C. The intermediate part 91E2 is made to have a bending shape that is convexed outward in a direction away from the second conductor sheet 32 (outwardly).

The intermediate part 92E2 of the second conductor sheet 32 has a substrate part 32C and one pair of side plate parts 92D2, 92D2. Side plate parts 92D2, 92D2 are made to have a curved shape that is convexed toward the inside of cylindrical part 105 (for example, arched cross section), and extend inclined so as to gradually approach the first conductor sheet 31 in a widening direction from both side edges of the substrate part 32C. The intermediate part 92E2 is made to have a bending shape that is convexed outward in a direction away from the first conductor sheet 31 (outwardly).

Intermediate parts 91E2, 92E2 of conductor sheets 31, 32 form the cylindrical part 105. The cylindrical part 105 has a configuration which is preferable when one wants to enlarge an interior space 38 (see FIG. 2) to increase the efficiency of cooling with a heat medium such as cooling water.

Figure 10:
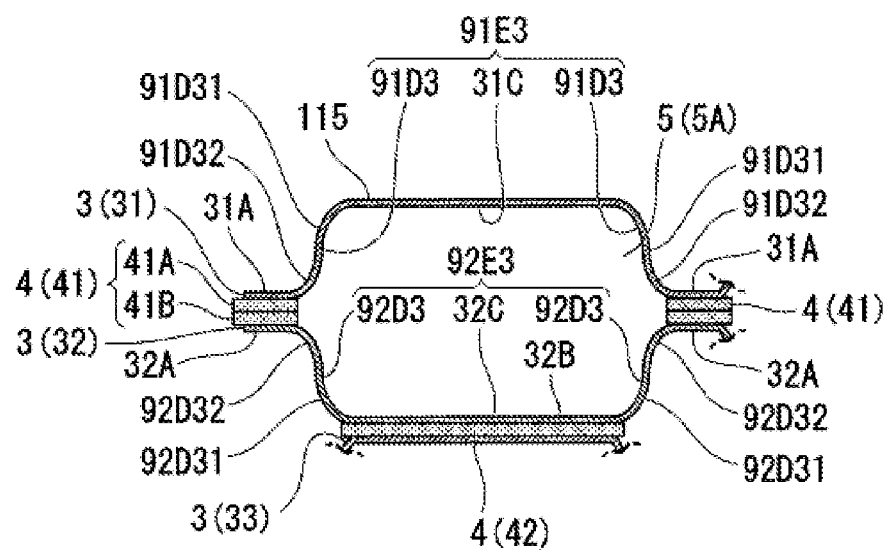
FIG. 10 is a sectional view schematically showing a third modified example of a cylindrical part of a battery package of an embodiment.

FIG. 10 is a sectional view showing a cylindrical part 115 which is a third modified example of the cylindrical part 35.

An intermediate part 91E3 of a first conductor sheet 31 has a substrate part 31C and one pair of side plate parts 91D3, 91D3.

The side plate part 91D3 is made to have a S letter-like shape in which a first curved part 91D31 of a curved shape that is convexed toward the outside of the cylindrical part 115 (for example, arched cross section) and a second curved part 91D32 of a curved shape that is convexed toward the inside of the cylindrical part 115 (for example, arched cross section) are combined. The first curved part 91D31 is provided connecting to the substrate part 31C, and the second curved part 91D32 is provided connecting to an adhesive part 31A. Side plate parts 91D3, 91D3 extend inclined so as to gradually approach a second conductor sheet 32 in a widening direction from both side edges of the substrate part 31C.

An intermediate part 92E3 of the second conductor sheet 32 has a substrate part 32C and one pair of side plate parts 92D3, 92D3.

The side plate part 92D3 is made to have a S letter-like shape in which a first curved part 92D31 of a curved shape that is convexed toward the outside of the cylindrical part 115 (for example, arched cross section), and a second curved part 92D32 of a curved shape that is convexed toward the inside of the cylindrical part 115 (for example, arched cross section) are combined. The first curved part 92D31 is provided connecting to a substrate part 32C, and the second curved part 92D32 is provided connecting to an adhesive part 32A. Side plate parts 92D3, 92D3 extend inclined so as to gradually approach the first conductor sheet 31 in a widening direction from both side edges of the substrate part 32C.

Intermediate parts 91E3, 92E3 of conductor sheets 31, 32 form the cylindrical part 115. Since the cylindrical part 115 can be prepared even when a tensile force to be added to the conductor sheet 3 in a spreading step shown in FIG. 4 (D) is small, this is a configuration that manufacturing is easy.

For comparison, an assembled battery comprising a battery package having a different shape from that of the battery package 1 will be illustrated.

FIG. 11 is a sectional view schematically showing an assembled battery 110 comprising a battery package 101 which is different from the battery package 1 shown in FIG. 1.

The battery package 101 has first to fourth conductor sheets 131, 132, 133, 134.

An intermediate part 131E of the first conductor sheet 131 has a substrate part 131C and one pair of side plate parts 131D, 131D inclined to the substrate part 131C. An intermediate part 133E of the third conductor sheet 133 has a substrate part 133C and one pair of side plate parts 133D, 133D inclined to the substrate part 133C.

The second conductor sheet 132 and the fourth conductor sheet 134 are formed flat. For that reason, a cylindrical part 135 (135A) which is formed by the intermediate part 131E of the first conductor sheet 131 and the second conductor sheet 32, and a cylindrical part 135 (135B) which is formed by the intermediate part 133E of the third conductor sheet 133 and the fourth conductor sheet 134 have a quadrangular tubular shape of a trapezoidal cross section.

Since in the battery package 101, conductor sheets 132, 134 are flat as compared with the battery package 1 having a hexagonal tubular cylindrical part 35 (see FIG. 1), the cylindrical part 135 cannot be deformed in a widening direction, and it is difficult to adjust a distance between electrode plates. For that reason, this is disadvantageous in respect of the energy efficiency. Additionally, in the battery package 101, wrinkles are easily generated in conductor sheets 131, 132, 133, 134 at the time of manufacturing. Additionally, when a compressive force in the thickness direction (Z direction) is added to the battery package 101 (see FIG. 5), distortion is easily generated in conductor sheets 131, 132, 133, 134.

In addition, the present invention is not limited to above-mentioned embodiments, and can be variously altered within a range, where the gist of the present invention is not deviated.

In the battery package 1 shown in FIG. 1, both of conductor sheets 31, 32 are continuously formed in the width direction over a plurality of cylindrical parts 35, but such a configuration is also possible that only one of conductor sheets facing each other is continuously formed in the width direction over a plurality of cylindrical parts.

In the battery package 1 shown in FIG. 1, the adhesive layer 42 adhering the second conductor sheet 32 and the third conductor sheet 33 may not be of an integral structure, and for example, may be composed of two or more adhesive parts which are spaced in the width direction. Similarly, adhesive layers 41, 43 may also be composed of, for example, two or more adhesive parts which are spaced in the width direction.

As the conductor sheet, one having no flexibility may also be used.

In the battery package 1 shown in FIG. 1, intermediate parts 31E, 32E, 33E, 34E as a whole have a bending shape that is convexed outwardly, but the intermediate parts may have a bending shape that at least a part of them is convexed outwardly.

In the battery package 1, since side plate parts 31D, 32D, 33D, 34D of conductor sheets 31, 32, 33, 34 are inclined at an angle of less than 90° to substrate parts 31C, 32C, 33C, 34C, the cylindrical part 35 has a hexagonal tubular shape, but the angle may also be 90° or more.

The battery accommodated in the battery package 1 is not limited to a lithium ion battery, but may also be an electric double layer capacitor.

[Assembled Battery]

FIG. 1 is a sectional view schematically showing an assembled battery 10 which is an assembled battery of an embodiment. FIG. 2 is a sectional view schematically showing a battery package 1.

The assembled battery 10 is provided with a battery package 1, and a plurality of unit batteries 2.

The battery package 1 is provided with a plurality of conductor sheets 3. The battery package 1 shown in FIG. 1 and FIG. 2 is provided with, for example, four conductor sheets 3 which are arranged in an overlapping direction. These four conductor sheets 3 are also referred to as first to fourth conductor sheets 31, 32, 33, 34, respectively, in order from the top.

As shown in FIG. 2, the conductor sheet 3 (31, 32, 33, 34) is formed of a laminate in which a metal layer 6 and a resin layer 7 are laminated, and has flexibility.

In the conductor sheet 3, the metal layer 6 is a necessary feature for securing electrically conductive performance. The conductor sheet 3 may be composed only of the metal layer 6, but it is preferable that it has a resin layer 7 for securing the insulation property.

Examples of a metal constituting the metal layer 6 include aluminum, copper, stainless steel, nickel, iron, and an alloy containing one or more of them. The metal layer 6 is, for example, formed of a metal foil containing one or more kinds selected from the group consisting of aluminum, copper, stainless steel, nickel, and iron. The metal may be carbon steel which is an iron alloy. Particularly, aluminum foil, copper foil, and stainless-steel foil are preferable, from a view point of workability, easy availability, the cost, the strength (piercing strength, tensile strength, and the like), corrosion resistance and the like.

The metal layer 6 may have a structure having a substrate metal layer and a plated layer formed on a surface thereof. The substrate metal layer and the plated layer are composed of, for example, the above-mentioned metals.

The stainless-steel foil is composed of, for example, stainless steel such as austenitic-based, ferritic-based, and martensitic-based stainless steels. As the austenitic based stainless steel, there are SUS304, 316, 301, and the like, as the ferritic-based stainless steel, there are SUS430 and the like, and as the martensitic-based stainless steel, there are SUS410 and the like.

The metal layer 6 has the function of reducing liquid leakage, for example, from a battery accommodating part 5.

A thickness of the metal layer 6 is preferably 1 mm or less, further preferably 500 μm or less, and most preferably 200 μm or less, from a view point of enhancement of workability of the conductor sheet 3. A thickness of the metal layer 6 is preferably 5 μm or more, further preferably 20 μm or more, and most preferably 40 μm or more, from a view point of enhancement of the mechanical strength of the conductor sheet 3. Additionally, an upper limit value and a lower limit value in a numerical vale range can be arbitrarily combined.

When a metal layer which is softened by annealing (annealed aluminum material) is used as the metal layer 6, flexible performance becomes good, and it becomes easy to make the conductor sheet 3 have a shape described later.

The resin layer 7 is composed of, for example, one or more kinds of polyolefin resins such as stretched polypropylene (OPP); polyester resins such as polyethylene terephthalate (PET), polyethylene naphthalate (PEN), and polybutylene terephthalate (PBT); polyamide resins such as nylon (Ny); polyimide resins; fluorine resins; acrylic resins; thermosetting resin-based paints (thermosetting resins); polyurethane resins; and the like. Among them, OPP and the thermosetting resin-based paints are preferable, from a view point of durability.

A thickness of the resin layer 7 is preferably 200 μm or less, further preferably 100 μm or less, and most preferably 50 μm or less, from a view point of enhancement of workability of the conductor sheet 3. A thickness of the resin layer 7 is preferably 1 μm or more, and further preferably 10 μm or more, from a view point of enhancement of the mechanical strength of the conductor sheet 3.

The resin layer 7 may be of a monolayer structure, or a multilayer structure. Examples of the resin layer 7 having a multilayer structure comprise a bilayer film in which a PET film and a biaxially stretched polyamide resin film (ONy) are laminated. Additionally, the resin layer 7 may be of a multilayer structure of three or more layers.

A desired color or a desired design may be imparted to the resin layer 7, by containing a coloring material such as a pigment.

The conductor sheet 3 has an attitude, with the metal layer 6 being directed to the battery accommodating part 5.

In FIG. 1 and FIG. 2, an X direction is a width direction of the conductor sheet 3. A Y direction is a direction orthogonal to the X direction in a plane along the conductor sheet 3 (for example, substrate part 31C). A Z direction is a direction orthogonal to the X direction and the Y direction, and is a direction of a thickness of the conductor sheet 3.

Among conductor sheets 31, 32, 33, 34, first and second conductor sheets 31, 32 are one pair of conductor sheets 3 which are arranged facing each other. Conductor sheets 31, 32 are referred to as conductor sheets 3 of a first set 30A.

Third and fourth conductor sheets 33, 34 are one pair of conductor sheets 3 which are arranged facing each other. Conductor sheets 33, 34 are referred to as conductor sheets 3 of a second set 30B. The first set 30A and the second set 30B adjoin in the thickness direction (Z direction).

The first conductor sheet 31 and the second conductor sheet 32 are partially adhered with a plurality of linear adhesive layers 4 (adhesive layer 41). The adhesive layer 41 is constituted by laminating an adhesive layer 41A formed on a lower surface 31a (counter surface) of the conductor sheet 31 and an adhesive layer 41B formed on an upper surface 32b (counter surface) of the conductor sheet 32.

Adhesive layers 41A, 41B are formed into, for example, a belt-like shape having a constant width along the Y direction. Adhesive layers 41A, 41B are made to have the same width, and are formed by overlapping them. A plurality of adhesive layers 41 are formed apart from each other in the X direction. It is preferable that the plurality of adhesive layers 41 are formed at a constant interval in the X direction.

Of the first conductor sheet 31, a part which is adhered to the second conductor sheet 32 with the adhesive layer 41 is referred to as adhesive part 31A. The adhesive part 31A is, for example, a belt-like part of a constant width along the Y direction. A plurality of adhesive parts 31A are formed apart from each other in the X direction. It is preferable that the plurality of adhesive parts 31A are formed at a constant interval in the X direction.

Of the second conductor sheet 32, a part which is adhered to the first conductor sheet 31 with the adhesive layer 41 is referred to as adhesive part 32A. The adhesive part 32A is, for example, a belt-like part of a constant width along the Y direction. A plurality of adhesive parts 32A are formed apart from each other in the X direction. It is preferable that the plurality of adhesive parts 32A are formed at a constant interval in the X direction.

The second conductor sheet 32 and the third conductor sheet 33 are partially adhered with a plurality of linear adhesive layers 42.

The adhesive layer 42 is formed between a lower surface 32a (counter surface) of the conductor sheet 32 and an upper surface 33b (counter surface) of the conductor sheet 33.

The adhesive layer 42 is formed into, for example, a belt-like shape of a constant width along the Y direction. A plurality of adhesive layers 42 are formed apart from each other in the X direction. It is preferable that the plurality of adhesive layers 42 are formed at a constant interval in the X direction.

Of the second conductor sheet 32, a part which is adhered to the third conductor sheet 33 with the adhesive layer 42 is referred to as adhesive part 32B. The adhesive part 32B is, for example, a belt-like part of a constant width along the Y direction. A plurality of adhesive parts 32B are formed apart from each other in the X direction. It is preferable that the plurality of adhesive parts 32B are formed at a constant interval in the X direction.

Of the third conductor sheet 33, a part which is adhered to the second conductor sheet 32 with the adhesive layer 42 is referred to as adhesive part 33B. The adhesive part 33B is, for example, a belt-like part of a constant width along the Y direction. A plurality of adhesive parts 33B are formed apart from each other in the X direction. It is preferable that the plurality of adhesive parts 33B are formed at a constant interval in the X direction.

In the second conductor sheet 32, the adhesive part 32A in which an upper surface 32b (first surface) is adhered to the first conductor sheet 31 and the adhesive part 32B in which a lower surface 32a (second surface) is adhered to the third conductor sheet 33 are alternately arranged in the width direction (X direction) of the second conductor sheet 32.

It is preferable that the adhesive part 32B is formed to be wider in width than the adhesive part 32A.

The third conductor sheet 33 and the fourth conductor sheet 34 are partially adhered with a plurality of linear adhesive layers 43.

The adhesive layer 43 is constituted by laminating an adhesive layer 43A formed on a lower surface 33a (counter surface) of the conductor sheet 33 and an adhesive layer 43B formed on an upper surface 34b (counter surface) of the conductor sheet 34.

Adhesive layers 43A, 43B are formed into, for example, a belt-like shape of a constant width along the Y direction. Adhesive layers 43A, 43B are made to have the same width, and are formed by overlapping them. A plurality of adhesive layers 43 are formed apart from each other in the X direction. It is preferable that the plurality of adhesive layers 43 are formed at a constant interval in the X direction.

Examples of an adhesive constituting the adhesive layers 41, 42, 43 include insulating materials such as a polyolefin-based adhesive, a urethane-based adhesive, an epoxy-based adhesive, an acrylic-based adhesive, a nylon-based adhesive, and a polyester based adhesive.

As the adhesive, a polyolefin-based adhesive composed of a polyolefin resin is preferable. Examples of the polyolefin resin include polyethylene, polypropylene, poly-1-butene, polyisobutylene, a copolymer of propylene and ethylene, a copolymer of propylene and an olefin-based monomer, and the like. Among them, from a view point of adhesiveness, durability, and the like, maleic anhydride-modified polypropylene is preferable. Additionally, it is preferable that as a crosslinking agent, a compound containing a plurality of epoxy groups is contained. More specifically, an adhesive containing an acid-modified polyolefin resin (for example, maleic anhydride-modified polypropylene) (A) and an epoxy resin-based compound (B) can be used. The adhesive containing an acid-modified polyolefin resin (A) and an epoxy resin-based compound (B) is preferable from a view point of the strength at adhesion, and a package having the high strength can be manufactured. The epoxy resin-based compound (B) is preferably, for example, a compound having two or more epoxy groups in one molecule, and an adhesive containing 1 to 30% of a bisphenol type phenol A type epoxy resin, or a phenol novolak-modified epoxy resin is further preferable.

By using a polyolefin-based adhesive as the adhesive constituting the adhesive layers 41, 42, 43, the adhesion strength of the conductor sheet 3 can be enhanced, and the battery package 1 excellent in the strength is obtained.

By inclusion of an acid-modified polyolefin resin and a crosslinking agent by the adhesive, the battery package 1 in which the adhesion strength of the conductor sheet 3 is high, and durability is excellent can be manufactured.

Of the third conductor sheet 33, a part which is adhered to the fourth conductor sheet 34 with the adhesive layer 43 is referred to as adhesive part 33A. The adhesive part 33A is, for example, a belt-like part of a constant width along the Y direction. A plurality of adhesive parts 33A are formed apart from each other in the X direction. It is preferable that the plurality adhesive parts 33A are formed at a constant interval in the X direction.

Of the fourth conductor sheet 34, a part which is adhered to the third conductor sheet 33 with the adhesive layer 43 is referred to as adhesive part 34A. The adhesive part 34A is, for example, a belt-like part of a constant width along the Y direction. A plurality of adhesive parts 34A are formed apart from each other in the X direction. It is preferable that the plurality of adhesive parts 34A are formed at a constant interval in the X direction.

In the third conductor sheet 33, the adhesive part 33A in which a lower surface 33a (first surface) is adhered to the fourth conductor sheet 34 and the adhesive part 33B in which an upper surface 33b (second surface) is adhered to the second conductor sheet 32 are alternately arranged in the width direction (X direction) of the third conductor sheet 33.

It is preferable that the adhesive part 33B is formed to be wider in width than the adhesive part 33A.

As shown in FIG. 2, a part between adhesive parts 31A, 31A of the first conductor sheet 31 adjoining in the X direction is referred to as intermediate part 31E (non-adhesive part). The intermediate part 31E has a substrate part 31C and one pair of side plate parts 31D, 31D inclined to the substrate part 31C. The substrate part 31C faces one surface (upper surface of FIG. 1) of a unit battery 2 (2A) in the battery accommodating part 5 (5A).

Side plate parts 31D, 31D extend from both side edges of the substrate part 31C toward adhesive parts 31A, 31A, respectively. Side plate parts 31D, 31D extend inclined so as to gradually approach the second conductor sheet 32 (conductor sheet 3 on an opposite side) in a widening direction from both side edges of the substrate part 31C. As side plate parts 31D, 31D approach the second conductor sheet 32, they move away from each other.

The intermediate part 31E has a bending shape that is convexed outward in a direction away from the second conductor sheet 32 (outwardly), relative to a plane passing through the adjacent adhesive parts 31A, 31A.

The adhesive part 32B of the second conductor sheet 32 is also referred to as substrate part 32C. The substrate part 32C faces the other surface (lower surface of FIG. 1) of the unit battery 2 (2A) in the battery accommodating part 5 (5A). The substrate part 31C of the conductor sheet 31 and the substrate part 32C of the conductor sheet 32 stay away in the thickness direction (Z direction).

Of the second conductor sheet 32, parts extending from both side edges of the substrate part 32C toward adhesive parts 32A, 32A, respectively, are referred to as side plate parts 32D, 32D. Side plate parts 32D, 32D extend inclined so as to gradually approach the first conductor sheet 31 (conductor sheet 3 on an opposite side) in a widening direction from both side edges of the substrate part 32C. As side plate parts 32D, 32D approach the first conductor sheet 31, they move away from each other.

A part containing the substrate part 32C and one pair of side plate parts 32D, 32D, of the second conductor sheet 32, is referred to as intermediate part 32E (non-adhesive part). The intermediate part 32E is a part between adhesive parts 32A, 32A adjoining in the X direction.

The intermediate part 32E has the substrate part 32C and side plate parts 32D, 32D inclined to the substrate part 32C. The intermediate part 32E has a bending shape that is convexed outward in a direction away from the first conductor sheet 31 (outwardly) relative to a plane passing through adjacent adhesive parts 32A, 32A.

Side plate parts 31D, 31D of the intermediate part 31E of the first conductor sheet 31 approach the second conductor sheet 32 toward a widening direction, and side plate parts 32D, 32D of the intermediate part 32E of the second conductor sheet 32 approach the first conductor sheet 31 toward a widening direction. For that reason, the cylindrical part 35 (35A) has a hexagonal tubular shape composed of substrate parts 31C, 32C and side plate parts 31D, 31D, 32D, 32D.

When one intermediate part has a substrate part, and one pair of side plate parts inclined so as to approach a conductor sheet on an opposite side toward a widening direction, and the other intermediate part has a substrate part, and one pair of side plate parts inclined so as to approach a conductor sheet on an opposite side toward a widening direction, a shape composed of these substrate parts and side plate parts can be called hexagonal tubular shape.

It is desirable that intermediate parts 31E, 32E of conductor sheets 31, 32 have a small difference in a width dimension. For example, it is preferable that the difference in a width dimension between intermediate parts 31E, 32E is 10% or less to a greater dimension of width dimensions of intermediate parts 31E, 32E.

It is preferable that a width dimension of the intermediate part 31E of the conductor sheet 31 and a width dimension of the intermediate part 32E of the conductor sheet 32 are equal.

A width dimension of the intermediate part 31E is a total of a width dimension of the substrate part 31C and a width dimension of side plate parts 31D, 31D. A width dimension of the intermediate part 32E is a total of a width dimension of the substrate part 32C and a width dimension of side plate parts 32D, 32D.

A width dimension of substrate parts 31C, 32C is a dimension in a direction along substrate parts 31C, 32C and orthogonal to adhesive parts 31A, 32A. A width dimension of side plate parts 31D, 32D is a dimension in a direction along side plate parts 31D, 32D and orthogonal to adhesive parts 31A, 32A.

The adhesive part 33B of the third conductor sheet 33 is also referred to as substrate part 33C. The substrate part 33C faces one surface (upper surface of FIG. 1) of the unit battery 2 (2B) in the battery accommodating part 5 (5B).

Of the third conductor sheet 33, parts extending from both side edges of the substrate part 33C toward adhesive parts 33A, 33A, respectively, are referred to as side plate parts 33D, 33D. Side plate parts 33D, 33D extend inclined so as to gradually approach the fourth conductor sheet 34 (conductor sheet 3 on an opposite side) from both side edges of the substrate part 33C in a widening direction. As side plate parts 33D, 33D approach the fourth conductor sheet 34, they move away from each other.

A part containing the substrate part 33C and one pair of side plate parts 33D, 33D, of the third conductor sheet 33, is referred to as intermediate part 33E (non-adhesive part). The intermediate part 33E is a part between adhesive parts 33A, 33A adjoining in the X direction.

The intermediate part 33E has the substrate part 33C and side plate parts 33D, 33D inclined to the substrate part 33C. The intermediate part 33E has a bending shape that is convexed outward in a direction away from the fourth conductor sheet 34 (outwardly), relative to a plane passing through adjacent adhesive parts 33A, 33A.

A part between adhesive parts 34A, 34A of the fourth conductor sheet 34 adjoining in the X direction is referred to as intermediate part 34E (non-adhesive part). The intermediate part 34E has the substrate part 34C and one pair of side plate parts 34D, 34D inclined to the substrate part 34C. The substrate part 34C faces one surface (lower surface of FIG. 1) of the unit battery 2 (2B) in the battery accommodating part 5 (5B). The substrate part 33C of the conductor sheet 33 and the substrate part 34C of the conductor sheet 34 stay away in the thickness direction (Z direction).

Side plate parts 34D, 34D extend from both side edges of the substrate part 34C toward adhesive parts 34A, 34A, respectively. Side plate parts 34D, 34D extend inclined so as to gradually approach the third conductor sheet 33 (conductor sheet 3 on an opposite side) from both side edges of the substrate part 34C in a widening direction. As side plate parts 33D, 33D approach the third conductor sheet 33, they move away from each other.

The intermediate part 34E has a bending shape that is convexed outward in a direction away from the third conductor sheet 33 (outwardly), relative to a plane passing through adjacent adhesive parts 34A, 34A.

In FIG. 2, substrate parts 31C, 32C, 33C, 34C are formed along an XY plane.

Side plate parts 33D, 33D of the intermediate part 33E of the third conductor sheet 33 approach the fourth conductor sheet 34 toward a widening direction, and side plate parts 34D, 34D of the intermediate part 34E of the fourth conductor sheet 34 approach the third conductor sheet 33 toward a widening direction. For that reason, the cylindrical part 35 (35B) has a hexagonal tubular shape composed of substrate parts 33C, 34C and side plate parts 33D, 33D, 34D, 34D.

It is desirable that intermediate parts 33E, 34E of conductor sheets 33, 34 have a small difference in a width dimension. For example, it is preferable that the difference in a width dimension between intermediate parts 33E, 34E is 10% or less to a greater dimension of width dimensions of intermediate parts 33E, 34E.

It is preferable that a width dimension of the intermediate part 33E of the conductor sheet 33 and a width dimension of the intermediate part 34E of the conductor sheet 34 are equal.

A width dimension of the intermediate part 33E is a total of a width dimension of the substrate part 33C and a width dimension of side plate parts 33D, 33D. A width dimension of the intermediate part 34E is a total of a width dimension of the substrate part 34C and a width dimension of side plate parts 34D, 34D.

A width dimension of substrate parts 33C, 34C is a dimension in a direction along substrate parts 33C, 34C and orthogonal to adhesive parts 33A, 34A. A width dimension of side plate parts 33D, 34D is a dimension in a direction along side plate parts 33D, 34D and orthogonal to adhesive parts 33A, 34A.

The intermediate part 31E (substrate part 31C and side plate parts 31D, 31D) of the first conductor sheet 31 and the intermediate part 32E (substrate part 32C and side plate parts 32D, 32D) of the second conductor sheet 32 form a hollow polygonal tubular cylindrical part 35 (35A). An interior space of the cylindrical part 35 (35A) is a battery accommodating part 5 (5A). The cylindrical part 35 (35A) is partitioned with adhesive parts 31A, 32A.

Side plate parts 31D, 31D have a flat shape in which an XZ cross section is linear, and are inclined at an angle θ1 (0°<θ1<90°) to the substrate part 31C. Side plate parts 32D, 32D have a flat shape in which an XZ cross section is linear, and are inclined at an angle θ2 (0°<θ2<90°) to the substrate part 32C.

Both of conductor sheets 31, 32 are continuously formed in the width direction over a plurality of cylindrical parts 35 (35A).

The intermediate part 33E (substrate part 33C and side plate parts 33D, 33D) of the third conductor sheet 33 and the intermediate part 34E (substrate part 34C and side plate parts 34D, 34D) of the fourth conductor sheet 34 form a hollow polygonal tubular cylindrical part 35 (35B). An interior space of the cylindrical part 35 (35B) is the battery accommodating part 5 (5B). The cylindrical part 35 (35B) is partitioned with adhesive parts 33A, 34A.

Side plate parts 33D, 33D have a flat shape in which an XZ cross section is linear, and are inclined at an angle θ3 (0°<θ3<90°) to the substrate part 33C. Side plate parts 34D, 34D have a flat shape in which an XZ cross section is linear, and are inclined at an angle θ4 (0°<θ4<90°) to the substrate part 34C.

The angle θ3 may be the same as the angle θ1. The angle θ4 may be the same as the angle θ2. The angles θ1 to θ4 may be the same angle.

Both of conductor sheets 33, 34 are continuously formed in the width direction over a plurality of cylindrical parts 35 (35B).

Since the cylindrical part 35 has a hexagonal tubular shape having flat side plate parts 31D, 32D, 33D, 34D, this is a particularly preferable configuration in point of the strength of the assembled battery 10.

Side plate parts 32D, 32D and the adhesive part 32A of the second conductor sheet 32, and side plate parts 33D, 33D and the adhesive part 33A of the third conductor sheet 33 form a plurality of hollow polygonal tubular (hexagonal tubular in FIG. 1) cylindrical parts 37.

Since the adhesive part 32A is narrowed as compared with the adhesive part 32B, and the adhesive part 33A is formed narrower as compared with the adhesive part 33B, an interior space 38 of the cylindrical part 37 has a smaller width dimension than that of the battery accommodating part 5 which is an interior space of the cylindrical part 35.

The interior space 38 of the cylindrical part 37 is a space which is secured between the first set 30A and the second set 30B. A heat medium (for example, cooling water, air for cooling or the like) which was supplied by a feed mechanism not shown can be passed though the interior space 38. Thereby, a temperature of the assembled battery 10 can be adjusted.

In the battery package 1, a plurality of cylindrical parts 35 are arranged in parallel in the width direction (X direction) of the conductor sheet 3. Additionally, cylindrical parts 37 are also arranged in parallel in the width direction (X direction) of the conductor sheet 3. The battery package 1 has a honeycomb structure in which a plurality of cylindrical parts 35 are arranged regularly.

One pair of conductor sheets 3, 3 facing each other of the battery package 1 have two or more cylindrical parts 35. For example, in the battery package 1 shown in FIG. 1, conductor sheets 31, 32 have two or more cylindrical parts 35 lining up in the width direction (X direction). The number of cylindrical parts which are formed by one pair of conductor sheets facing each other is preferably 3 or more, and can be, for example, 4 to 10.

Since the battery package 1 has two or more cylindrical parts 35, the assembled battery 10 having two or more unit batteries 2 which are connected in parallel is obtained. The number of the unit batteries 2 is preferably 3 or more, and is, for example, 4 to 10.

Since the battery package 1 can constitute the assembled battery 10 in which two or more unit batteries 2 are arranged in parallel, this is preferable from a view point of electric power supply.

It is preferable that the battery package 1 has two or more sets of conductor sheets 3, 3 facing each other. For example, the battery package 1 shown in FIG. 1 has two sets (first set 30A and second set 30B) of conductor sheets 3. The number of conductor sheets 3, 3 facing each other (number of sets) is preferably 3 or more sets, and can be, for example, 4 to 20 sets.

When the battery package 1 has two or more sets of conductor sheets 3, 3, the assembled battery 10 in which two or more unit batteries 2 are arranged in series is obtained. The number of the unit batteries 2 to be connected in series is preferably 3 or more, and is, for example, 4 to 20.

Since the battery package 1 having two or more sets of conductor sheets 3, 3 can constitute the assembled battery 10 in which two or more unit batteries 2 are arranged in series, this is preferable from a view point of electric power supply.

At least one of a plurality of adhesive parts 32A of the second conductor sheet 32 is electrically connected to at least one of adhesive parts 33A of the third conductor sheet 33 with a connecting part 39 interposed between the adhesive part 32A and the adhesive part 33A.

Figure 12:
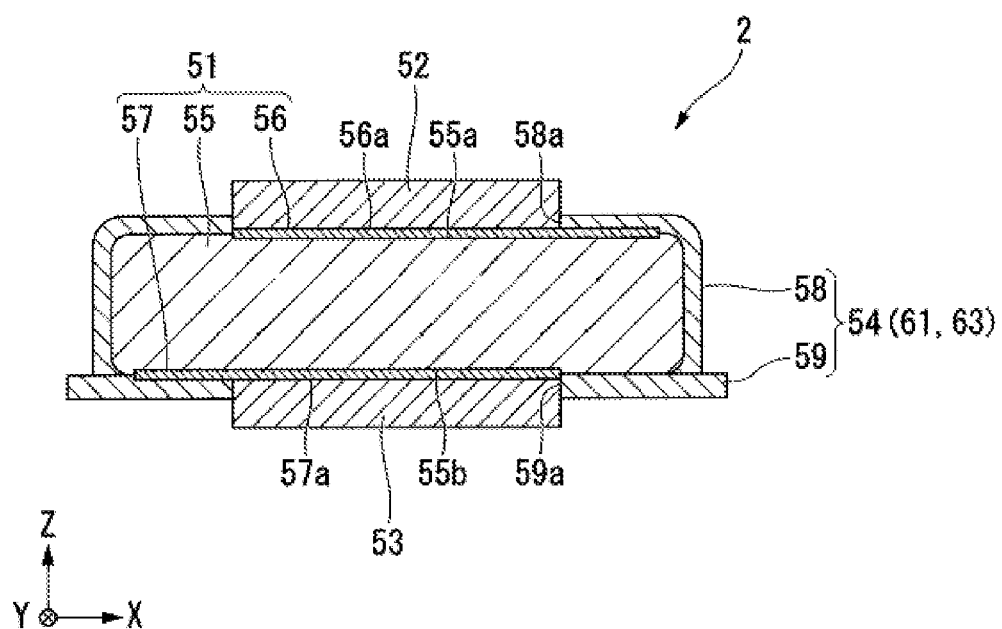
FIG. 12 is a sectional view schematically showing a unit battery used in an assembled battery of FIG. 1.

FIG. 12 is a sectional view schematically showing a unit battery 2.

The unit battery 2 is, for example, a lithium ion battery, and is provided with a battery body 51, a positive electrode terminal plate 52, a negative electrode terminal plate 53, and a container 54.

The battery body 51 has a main part 55, a positive electrode plate 56, and a negative electrode plate 57. The main part 55 has a separator (not shown), an electrolyte (not shown), a positive electrode active material layer (not shown), and a negative electrode active material layer (not shown). The main part 55 intervenes between the positive electrode plate 56 and the negative electrode plate 57. It is preferable that the main part 55 has a flat shape, and a thickness thereof is constant.

The positive electrode plate 56 is electrically connected to, for example, the positive electrode material layer (not shown) containing a positive electrode active material such as a lithium-based material. The positive electrode plate 56 is provided on one surface 55a (upper surface in FIG. 12) of the main part 55.

The negative electrode plate 57 is electrically connected to, for example, the negative electrode active material layer (not shown) containing a negative electrode active material such as a carbon-based material. The negative electrode plate 57 is provided on the other surface 55b (lower surface in FIG. 12) of the main part 55.

The positive electrode terminal plate 52 is provided facing an external surface 56a of the positive electrode plate 56, and is electrically connected to the positive electrode plate 56. The positive electrode terminal plate 52 is provided on one surface (upper surface in FIG. 12) of the battery body 51, and planarly abuts against a metal layer 6 of a conductor sheet 3 to be able to be electrically connected thereto.

The negative electrode terminal plate 53 is provided facing an external surface 57a of the negative electrode plate 57, and is electrically connected to the negative electrode plate 57. The negative electrode terminal plate 53 is provided on the other surface (lower surface in FIG. 12) of the battery body 51, and planarly abuts against the metal layer 6 of the conductor sheet 3 to be able to be electrically connected thereto.

The container 54 is composed of, for example, a battery container 61. A battery package 61 is composed of, for example, a conductor sheet 63. In the conductor sheet 63, the same configuration as that of the conductor sheet 3 may be adopted. The conductor sheet 63 may be, for example, formed of a laminate in which a metal layer composed of a metal such as aluminum and a resin layer composed of a resin such as polypropylene are laminated.

The container 54 is provided with a tray-like container body 58 and a lid part 59 closing an opening of the container body 58.

A peripheral part of the lid part 59 is joined to an opening end of the container body 58. The container 54 accommodates the battery body 51.

In the container body 58 and the lid part 59, opening parts 58a, 59a are formed, respectively. The positive electrode terminal plate 52 and the negative electrode terminal plate 53 are exposed through opening parts 58a, 59a.

Since the unit battery 2 has a structure that the battery body 51 is accommodate in the container 54 composed of the battery package 61, it is possible to state that the unit battery 2 has a structure that the battery body 51 is covered with the battery package 61.

The unit battery 2 has a flat shape, and is arranged, with the thickness direction being toward the Z direction. That the unit battery 2 has a flat shape refers to that a thickness dimension of the unit battery 2 is smaller than a dimension in the width direction (X direction of FIG. 1) and a dimension in the length direction (Y direction of FIG. 1). Since the unit battery 2 has a flat shape, the assembled battery 10 can be thinned.

Since the unit battery 2 is accommodated in the cylindrical part 35, it is packaged with the battery package 1. It is preferable that the unit battery 2 is accommodated in the battery accommodating part 5 to be freely taken in and out.

The unit battery 2 is formed flat, and has a structure that one and the other surfaces are provided with the positive electrode terminal plate 52 and the negative electrode terminal plate 53, respectively. In addition, the unit battery is not limited to only a structure of FIG. 12.

FIG. 3 is a circuit view of an assembled battery 10.

As shown in FIG. 3, a plurality of unit batteries 2A, 2A are connected in parallel with conductor sheets 31, 32. A plurality of unit batteries 2B, 2B are connected in parallel with conductor sheets 33, 34.

Unit batteries 2A, 2A and unit batteries 2B, 2B are connected in series with the connecting part 39.

[Assembled Battery] (First Modified Example)

Figure 15:
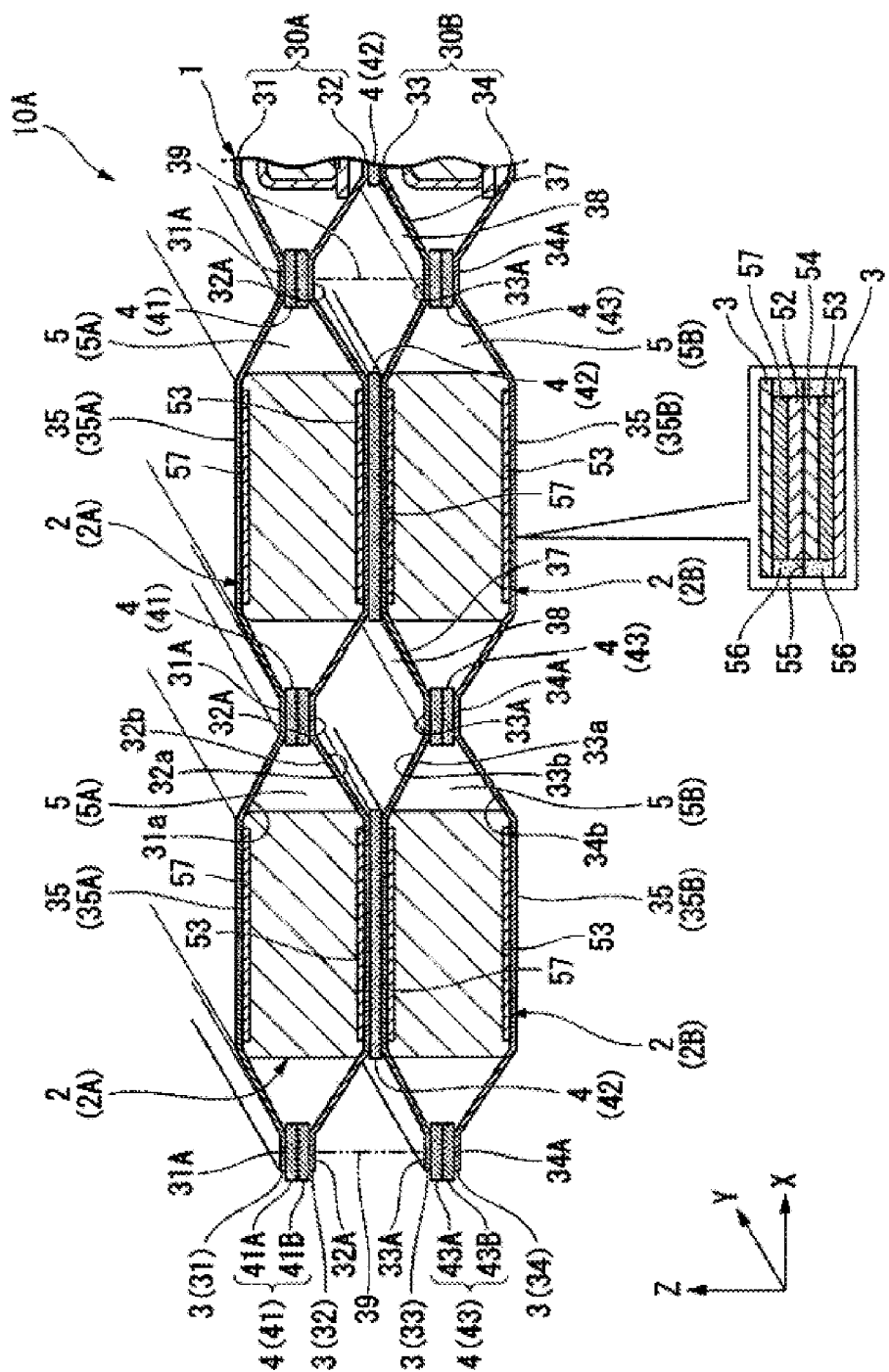
FIG. 15 is a sectional view schematically showing a first modified example of an assembled battery of an embodiment.

FIG. 15 is a sectional view schematically showing an assembled battery 10A which is a first modified example of the assembled battery of an embodiment. FIG. 2 is a sectional view schematically showing a battery package 1.

The assembled battery 10A is provided with a battery package 1 and a plurality of unit batteries 2.

The battery package 1 is provided with a plurality of conductor sheets 3. The battery package 1 shown in FIG. 15 and FIG. 2 is provided with, for example, four conductor sheets 3 which are arranged in an overlapping direction. These four conductor sheets 3 are also referred to as first to fourth conductor sheets 31, 32, 33, 34, respectively, in order from top.

As shown in FIG. 2, the conductor sheet 3 (31, 32, 33, 34) is formed of a laminate in which a metal layer 6 and a resin layer 7 are laminated, and has flexibility.

In the conductor sheet 3, the metal layer 6 is a necessary feature for securing electrically conductive performance. The conductor sheet 3 may be composed only of the metal layer 6, but it is preferable that it has a resin layer 7 for securing the insulation property.

A metal constituting the metal layer 6 may be, for example, aluminum, copper, stainless steel, nickel, iron or the like, or may be an alloy containing one or more of them. The metal layer 6 is, for example, formed of a metal foil containing one or more kinds selected from the group consisting of aluminum, copper, stainless steel, nickel, and iron. The metal may be carbon steel which is an iron alloy. Particularly, from a view point of workability, easy availability, the cost, the strength (piercing strength, tensile strength or the like), corrosion resistance, and the like, aluminum foil, copper foil, and stainless-steel foil are preferable.

The metal layer 6 may have a structure having a substrate metal layer and a plated layer formed on a surface thereof. The substrate metal layer and the plated layer are composed of, for example, the above-mentioned metals.

The stainless-steel foil is composed of, for example, stainless steel such as austenitic-based, ferritic-based, and martensitic-based stainless steels. As the austenitic based stainless steel, there are SUS304, 316, 301, and the like, as the ferritic-based stainless steel, there are SUS430 and the like, and as the martensitic-based stainless steel, there are SUS410 and the like.

The metal layer 6 has the function of reducing liquid leakage, for example, from a battery accommodating part 5.

A thickness of the metal layer 6 is preferably 1 mm or less, further preferably 500 µm or less, and most preferably 200 µm or less, from a view point of enhancement of workability of the conductor sheet 3. A thickness of the metal layer 6 is preferably 5 µm or more, further preferably 20 µm or more, and most preferably 40 µm or more, from a view point of enhancement of the mechanical strength of the conductor sheet 3. Additionally, an upper limit value and a lower limit value in a numerical vale range can be arbitrarily combined.

When a metal layer which is softened by annealing (annealed aluminum material) is used as the metal layer 6, flexible performance becomes good, and it becomes easy to make the conductor sheet 3 have a shape described later.

In the assembled battery 10A shown in FIG. 15 and FIG. 2, it is preferable that the metal layer 6 of the first conductor sheet 31 and the third conductor sheet 33 is composed of aluminum or an alloy thereof. It is preferable that the metal layer 6 of the second conductor sheet 32 and the fourth conductor sheet 34 is composed of copper or an alloy thereof. The metal layer 6 of conductor sheets 32, 34 may have a configuration that a nickel-plated layer is formed on a surface of a substrate metal layer composed of copper or an alloy thereof.

The resin layer 7 is composed of, for example, one or more kinds of polyolefin resins such as stretched polypropylene (OPP); polyester resins such as polyethylene terephthalate (PET), polyethylene naphthalate (PEN), and polybutylene terephthalate (PBT); polyamide resins such as nylon (Ny); polyimide resins; fluorine resins; acrylic resins; thermosetting resin-based paints (thermosetting resins); polyurethane resins; and the like. Among them, OPP and the thermosetting resin-based paints are preferable, from a view point of durability.

A thickness of the resin layer 7 is preferably 200 µm or less, further preferably 100 µm or less, and most preferably 50 µm or less, from a view point of enhancement of workability of the conductor sheet 3. A thickness of the resin layer 7 is preferably 1 µm or more, and further preferably 10 µm or more, from a view point of enhancement of the mechanical strength of the conductor sheet 3.

The resin layer 7 may be of a monolayer structure, or a multilayer structure. Examples of the resin layer 7 having a multilayer structure comprise a bilayer film in which a PET film and a biaxially stretched polyamide resin film (ONy) are laminated. Additionally, the resin layer 7 may be of a multilayer structure of three or more layers.

A desired color or a desired design may be imparted to the resin layer 7, by containing a coloring material such as a pigment.

The conductor sheet 3 has an attitude, with the metal layer 6 being directed to the battery accommodating part 5.

In FIG. 15 and FIG. 2, an X direction is a width direction of the conductor sheet 3. A Y direction is a direction orthogonal to the X direction in a plane along the conductor sheet 3 (for example, substrate part 31C). A Z direction is a direction orthogonal to the X direction and the Y direction, and is a direction of a thickness of the conductor sheet 3.

Among conductor sheets 31, 32, 33, 34, first and second conductor sheets 31, 32 are one pair of conductor sheets 3 which are arranged facing each other. Conductor sheets 31, 32 are referred to as conductor sheets 3 of a first set 30A.

Third and fourth conductor sheets 33, 34 are one pair of conductor sheets 3 which are arranged facing each other. Conductor sheets 33, 34 are referred to as conductor sheets 3 of a second set 30B. The first set 30A and the second set 30B adjoin in the thickness direction (Z direction).

The first conductor sheet 31 and the second conductor sheet 32 are partially adhered with a plurality of linear adhesive layers 4 (adhesive layer 41). The adhesive layer 41 is constituted by laminating an adhesive layer 41A formed on a lower surface 31a (counter surface) of the conductor sheet 31 and an adhesive layer 41B formed on an upper surface 32b (counter surface) of the conductor sheet 32.

Adhesive layers 41A, 41B are formed into, for example, a belt-like shape having a constant width along the Y direction. Adhesive layers 41A, 41B are made to have the same width, and are formed by overlapping them. A plurality of adhesive layers 41 are formed apart from each other in the X direction. It is preferable that the plurality of adhesive layers 41 are formed at a constant interval in the X direction.

Of the first conductor sheet 31, a part which is adhered to the second conductor sheet 32 with the adhesive layer 41 is referred to as adhesive part 31A. The adhesive part 31A is, for example, a belt-like part of a constant width along the Y direction. A plurality of adhesive parts 31A are formed apart from each other in the X direction. It is preferable that the plurality of adhesive parts 31A are formed at a constant interval in the X direction.

Of the second conductor sheet 32, a part which is adhered to the first conductor sheet 31 with the adhesive layer 41 is referred to as adhesive part 32A. The adhesive part 32A is, for example, a belt-like part of a constant width along the Y direction. A plurality of adhesive parts 32A are formed apart from each other in the X direction. It is preferable that the plurality of adhesive parts 32A are formed at a constant interval in the X direction.

The second conductor sheet 32 and the third conductor sheet 33 are partially adhered with a plurality of linear adhesive layers 42.

The adhesive layer 42 is formed between a lower surface 32a (counter surface) of the conductor sheet 32 and an upper surface 33b (counter surface) of the conductor sheet 33.

The adhesive layer 42 is formed into, for example, a belt-like shape of a constant width along the Y direction. A plurality of adhesive layers 42 are formed apart from each other in the X direction. It is preferable that the plurality of adhesive layers 42 are formed at a constant interval in the X direction.

Of the second conductor sheet 32, a part which is adhered to the third conductor sheet 33 with the adhesive layer 42 is referred to as adhesive part 32B. The adhesive part 32B is, for example, a belt-like part of a constant width along the Y direction. A plurality of adhesive parts 32B are formed apart from each other in the X direction. It is preferable that the plurality of adhesive parts 32B are formed at a constant interval in the X direction.

Of the third conductor sheet 33, a part which is adhered to the second conductor sheet 32 with the adhesive layer 42 is referred to as adhesive part 33B. The adhesive part 33B is, for example, a belt-like part of a constant width along the Y direction. A plurality of adhesive parts 33B are formed apart from each other in the X direction. It is preferable that the plurality of adhesive parts 33B are formed at a constant interval in the X direction.

In the second conductor sheet 32, the adhesive part 32A in which an upper surface 32b (first surface) is adhered to the first conductor sheet 31 and the adhesive part 32B in which a lower surface 32a (second surface) is adhered to the third conductor sheet 33 are alternately arranged in the width direction (X direction) of the second conductor sheet 32.

It is preferable that the adhesive part 32B is formed to be wider in width than the adhesive part 32A.

The third conductor sheet 33 and the fourth conductor sheet 34 are partially adhered with a plurality of linear adhesive layers 43.

The adhesive layer 43 is constituted by laminating an adhesive layer 43A formed on a lower surface 33a (counter surface) of the conductor sheet 33 and an adhesive layer 43B formed on an upper surface 34b (counter surface) of the conductor sheet 34.

Adhesive layers 43A, 43B are formed into, for example, a belt-like shape of a constant width along the Y direction. Adhesive layers 43A, 43B are made to have the same width, and are formed by overlapping them. A plurality of adhesive layers 43 are formed apart from each other in the X direction. It is preferable that the plurality of adhesive layers 43 are formed at a constant interval in the X direction.

Examples of an adhesive constituting the adhesive layers 41, 42, 43 include insulating materials such as a polyolefin-based adhesive, a urethane-based adhesive, an epoxy-based adhesive, an acrylic-based adhesive, a nylon-based adhesive, and a polyester based adhesive.

As the adhesive, a polyolefin-based adhesive composed of a polyolefin resin is preferable. Examples of the polyolefin resin include polyethylene, polypropylene, poly-1-butene, polyisobutylene, a copolymer of propylene and ethylene, a copolymer of propylene and an olefin-based monomer, and the like. Among them, from a view point of adhesiveness, durability, and the like, maleic anhydride-modified polypropylene is preferable. Additionally, it is preferable that as a crosslinking agent, a compound containing a plurality of epoxy groups is contained. More specifically, an adhesive containing an acid-modified polyolefin resin (for example, maleic anhydride-modified polypropylene) (A) and an epoxy resin-based compound (B) can be used. The adhesive containing an acid-modified polyolefin resin (A) and an epoxy resin-based compound (B) is preferable from a view point of the strength at adhesion, and a package having the high strength can be manufactured. The epoxy resin-based compound (B) is preferably, for example, a compound having two or more epoxy groups in one molecule, and an adhesive containing 1 to 30% of a bisphenol type phenol A type epoxy resin, or a phenol novolak-modified epoxy resin is further preferable.

By using a polyolefin-based adhesive as the adhesive constituting the adhesive layers 41, 42, 43, the adhesion strength of the conductor sheet 3 can be enhanced, and the battery package 1 excellent in the strength is obtained.

By inclusion of an acid-modified polyolefin resin and a crosslinking agent by the adhesive, the battery package 1 in which the adhesion strength of the conductor sheet 3 is high, and durability is excellent can be manufactured.

Of the third conductor sheet 33, a part which is adhered to the fourth conductor sheet 34 with the adhesive layer 43 is referred to as adhesive part 33A. The adhesive part 33A is, for example, a belt-like part of a constant width along the Y direction. A plurality of adhesive parts 33A are formed apart from each other in the X direction. It is preferable that the plurality adhesive parts 33A are formed at a constant interval in the X direction.

Of the fourth conductor sheet 34, a part which is adhered to the third conductor sheet 33 with the adhesive layer 43 is referred to as adhesive part 34A. The adhesive part 34A is, for example, a belt-like part of a constant width along the Y direction. A plurality of adhesive parts 34A are formed apart from each other in the X direction. It is preferable that the plurality of adhesive parts 34A are formed at a constant interval in the X direction.

In the third conductor sheet 33, the adhesive part 33A in which a lower surface 33a (first surface) is adhered to the fourth conductor sheet 34 and the adhesive part 33B in which an upper surface 33b (second surface) is adhered to the second conductor sheet 32 are alternately arranged in the width direction (X direction) of the third conductor sheet 33.

It is preferable that the adhesive part 33B is formed to be wider in width than the adhesive part 33A.

As shown in FIG. 2, a part between adhesive parts 31A, 31A of the first conductor sheet 31 adjoining in the X direction is referred to as intermediate part 31E (non-adhesive part). The intermediate part 31E has a substrate part 31C and one pair of side plate parts 31D, 31D inclined to the substrate part 31C. The substrate part 31C faces one surface (upper surface of FIG. 15) of a unit battery 2 (2A) in the battery accommodating part 5 (5A).

Side plate parts 31D, 31D extend from both side edges of the substrate part 31C toward adhesive parts 31A, 31A, respectively. Side plate parts 31D, 31D extend inclined so as to gradually approach the second conductor sheet 32 (conductor sheet 3 on an opposite side) in a widening direction from both side edges of the substrate part 31C. As side plate parts 31D, 31D approach the second conductor sheet 32, they move away from each other.

The intermediate part 31E has a bending shape that is convexed outward in a direction away from the second conductor sheet 32 (outwardly), relative to a plane passing through the adjacent adhesive parts 31A, 31A.

The adhesive part 32B of the second conductor sheet 32 is also referred to as substrate part 32C. The substrate part 32C faces the other surface (lower surface of FIG. 15) of the unit battery 2 (2A) in the battery accommodating part 5 (5A). The substrate part 31C of the conductor sheet 31 and the substrate part 32C of the conductor sheet 32 stay away in the thickness direction (Z direction).

Of the second conductor sheet 32, parts extending from both side edges of the substrate part 32C toward adhesive parts 32A, 32A, respectively, are referred to as side plate parts 32D, 32D. Side plate parts 32D, 32D extend inclined so as to gradually approach the first conductor sheet 31 (conductor sheet 3 on an opposite side) in a widening direction from both side edges of the substrate part 32C. As side plate parts 32D, 32D approach the first conductor sheet 31, they move away from each other.

A part containing the substrate part 32C and one pair of side plate parts 32D, 32D, of the second conductor sheet 32, is referred to as intermediate part 32E (non-adhesive part). The intermediate part 32E is a part between adhesive parts 32A, 32A adjoining in the X direction.

The intermediate part 32E has the substrate part 32C and side plate parts 32D, 32D inclined to the substrate part 32C. The intermediate part 32E has a bending shape that is convexed outward in a direction away from the first conductor sheet 31 (outwardly) relative to a plane passing through adjacent adhesive parts 32A, 32A.

Side plate parts 31D, 31D of the intermediate part 31E of the first conductor sheet 31 approach the second conductor sheet 32 toward a widening direction, and side plate parts 32D, 32D of the intermediate part 32E of the second conductor sheet 32 approach the first conductor sheet 31 toward a widening direction. For that reason, the cylindrical part 35 (35A) has a hexagonal tubular shape composed of substrate parts 31C, 32C and side plate parts 31D, 31D, 32D, 32D.

When one intermediate part has a substrate part, and one pair of side plate parts inclined so as to approach a conductor sheet on an opposite side toward a widening direction, and the other intermediate part has a substrate part, and one pair of side plate parts inclined so as to approach a conductor sheet on an opposite side toward a widening direction, a shape composed of these substrate parts and side plate parts can be called hexagonal tubular shape.

It is desirable that intermediate parts 31E, 32E of conductor sheets 31, 32 have a small difference in a width dimension. For example, it is preferable that the difference in a width dimension between intermediate parts 31E, 32E is 10% or less to a greater dimension of width dimensions of intermediate parts 31E, 32E.

It is preferable that a width dimension of the intermediate part 31E of the conductor sheet 31 and a width dimension of the intermediate part 32E of the conductor sheet 32 are equal.

A width dimension of the intermediate part 31E is a total of a width dimension of the substrate part 31C and a width dimension of side plate parts 31D, 31D. A width dimension of the intermediate part 32E is a total of a width dimension of the substrate part 32C and a width dimension of side plate parts 32D, 32D.

A width dimension of substrate parts 31C, 32C is a dimension in a direction along substrate parts 31C, 32C and orthogonal to adhesive parts 31A, 32A. A width dimension of side plate parts 31D, 32D is a dimension in a direction along side plate parts 31D, 32D and orthogonal to adhesive parts 31A, 32A.

The adhesive part 33B of the third conductor sheet 33 is also referred to as substrate part 33C. The substrate part 33C faces one surface (upper surface of FIG. 15) of the unit battery 2 (2B) in the battery accommodating part 5 (5B).

Of the third conductor sheet 33, parts extending from both side edges of the substrate part 33C toward adhesive parts 33A, 33A, respectively, are referred to as side plate parts 33D, 33D. Side plate parts 33D, 33D extend inclined so as to gradually approach the fourth conductor sheet 34 (conductor sheet 3 on an opposite side) from both side edges of the substrate part 33C in a widening direction. As side plate parts 33D, 33D approach the fourth conductor sheet 34, they move away from each other.

A part containing the substrate part 33C and one pair of side plate parts 33D, 33D, of the third conductor sheet 33, is referred to as intermediate part 33E (non-adhesive part). The intermediate part 33E is a part between adhesive parts 33A, 33A adjoining in the X direction.

The intermediate part 33E has the substrate part 33C and side plate parts 33D, 33D inclined to the substrate part 33C. The intermediate part 33E has a bending shape that is convexed outward in a direction away from the fourth conductor sheet 34 (outwardly), relative to a plane passing through adjacent adhesive parts 33A, 33A.

A part between adhesive parts 34A, 34A of the fourth conductor sheet 34 adjoining in the X direction is referred to as intermediate part 34E (non-adhesive part). The intermediate part 34E has the substrate part 34C and one pair of side plate parts 34D, 34D inclined to the substrate part 34C. The substrate part 34C faces one surface (lower surface of FIG. 15) of the unit battery 2 (2B) in the battery accommodating part 5 (5B). The substrate part 33C of the conductor sheet 33 and the substrate part 34C of the conductor sheet 34 stay away in the thickness direction (Z direction).

Side plate parts 34D, 34D extend from both side edges of the substrate part 34C toward adhesive parts 34A, 34A, respectively. Side plate parts 34D, 34D extend inclined so as to gradually approach the third conductor sheet 33 (conductor sheet 3 on an opposite side) from both side edges of the substrate part 34C in a widening direction. As side plate parts 33D, 33D approach the third conductor sheet 33, they move away from each other.

The intermediate part 34E has a bending shape that is convexed outward in a direction away from the third conductor sheet 33 (outwardly), relative to a plane passing through adjacent adhesive parts 34A, 34A.

In FIG. 2, substrate parts 31C, 32C, 33C, 34C are formed along an XY plane.

Side plate parts 33D, 33D of the intermediate part 33E of the third conductor sheet 33 approach the fourth conductor sheet 34 toward a widening direction, and side plate parts 34D, 34D of the intermediate part 34E of the fourth conductor sheet 34 approach the third conductor sheet 33 toward a widening direction. For that reason, the cylindrical part 35 (35B) has a hexagonal tubular shape composed of substrate parts 33C, 34C and side plate parts 33D, 33D, 34D, 34D.

It is desirable that intermediate parts 33E, 34E of conductor sheets 33, 34 have a small difference in a width dimension. For example, it is preferable that the difference in a width dimension between intermediate parts 33E, 34E is 10% or less to a greater dimension of width dimensions of intermediate parts 33E, 34E.

It is preferable that a width dimension of the intermediate part 33E of the conductor sheet 33 and a width dimension of the intermediate part 34E of the conductor sheet 34 are equal.

A width dimension of the intermediate part 33E is a total of a width dimension of the substrate part 33C and a width dimension of side plate parts 33D, 33D. A width dimension of the intermediate part 34E is a total of a width dimension of the substrate part 34C and a width dimension of side plate parts 34D, 34D.

A width dimension of substrate parts 33C, 34C is a dimension in a direction along substrate parts 33C, 34C and orthogonal to adhesive parts 33A, 34A. A width dimension of side plate parts 33D, 34D is a dimension in a direction along side plate parts 33D, 34D and orthogonal to adhesive parts 33A, 34A.

The intermediate part 31E (substrate part 31C and side plate parts 31D, 31D) of the first conductor sheet 31 and the intermediate part 32E (substrate part 32C and side plate parts 32D, 32D) of the second conductor sheet 32 form a hollow polygonal tubular cylindrical part 35 (35A). An interior space of the cylindrical part 35 (35A) is a battery accommodating part 5 (5A). The cylindrical part 35 (35A) is partitioned with adhesive parts 31A, 32A.

Side plate parts 31D, 31D have a flat shape in which an XZ cross section is linear, and are inclined at an angle θ1 (0°<θ1<90°) to the substrate part 31C. Side plate parts 32D, 32D have a flat shape in which an XZ cross section is linear, and are inclined at an angle θ2 (0°<θ2<90°) to the substrate part 32C.

Both of conductor sheets 31, 32 are continuously formed in the width direction over a plurality of cylindrical parts 35 (35A).

The intermediate part 33E (substrate part 33C and side plate parts 33D, 33D) of the third conductor sheet 33 and the intermediate part 34E (substrate part 34C and side plate parts 34D, 34D) of the fourth conductor sheet 34 form a hollow polygonal tubular cylindrical part 35 (35B). An interior space of the cylindrical part 35 (35B) is the battery accommodating part 5 (5B). The cylindrical part 35 (35B) is partitioned with adhesive parts 33A, 34A.

Side plate parts 33D, 33D have a flat shape in which an XZ cross section is linear, and are inclined at an angle θ3 (0°<θ3<90°) to the substrate part 33C. Side plate parts 34D, 34D have a flat shape in which an XZ cross section is linear, and are inclined at an angle θ4 (0°<θ4<90°) to the substrate part 34C.

The angle θ3 may be the same as the angle θ1. The angle θ4 may be the same as the angle θ2. The angles θ1 to θ4 may be the same angle.

Both of conductor sheets 33, 34 are continuously formed in the width direction over a plurality of cylindrical parts 35 (35B).

Since the cylindrical part 35 has a hexagonal tubular shape having flat side plate parts 31D, 32D, 33D, 34D, this is a particularly preferable configuration in point of the strength of the assembled battery 10A.

Side plate parts 32D, 32D and the adhesive part 32A of the second conductor sheet 32, and side plate parts 33D, 33D and the adhesive part 33A of the third conductor sheet 33 form a plurality of hollow polygonal tubular (hexagonal tubular in FIG. 15) cylindrical parts 37.

Since the adhesive part 32A is narrowed as compared with the adhesive part 32B, and the adhesive part 33A is formed narrower as compared with the adhesive part 33B, an interior space 38 of the cylindrical part 37 has a smaller width dimension than that of the battery accommodating part 5 which is an interior space of the cylindrical part 35.

The interior space 38 of the cylindrical part 37 is a space which is secured between the first set 30A and the second set 30B. A heat medium (for example, cooling water, air for cooling or the like) which was supplied by a feed mechanism not shown can be passed though the interior space 38. Thereby, a temperature of the assembled battery 10A can be adjusted.

In the battery package 1, a plurality of cylindrical parts 35 are arranged in parallel in the width direction (X direction) of the conductor sheet 3. Additionally, cylindrical parts 37 are also arranged in parallel in the width direction (X direction) of the conductor sheet 3. The battery package 1 has a honeycomb structure in which a plurality of cylindrical parts 35 are arranged regularly.

One pair of conductor sheets 3, 3 facing each other of the battery package 1 have two or more cylindrical parts 35. For example, in the battery package 1 shown in FIG. 15, conductor sheets 31, 32 have two or more cylindrical parts 35 lining up in the width direction (X direction). The number of cylindrical parts which are formed by one pair of conductor sheets facing each other is preferably 3 or more, and can be, for example, 4 to 10.

Since the battery package 1 has two or more cylindrical parts 35, the assembled battery 10A having two or more unit batteries 2 which are connected in parallel is obtained. The number of the unit batteries 2 is preferably 3 or more, and is, for example, 4 to 10.

Since the battery package 1 can constitute the assembled battery 10A in which two or more unit batteries 2 are arranged in parallel, this is preferable from a view point of electric power supply.

It is preferable that the battery package 1 has two or more sets of conductor sheets 3, 3 facing each other. For example, the battery package 1 shown in FIG. 15 has two sets (first set 30A and second set 30B) of conductor sheets 3. The number of conductor sheets 3, 3 facing each other (number of sets) is preferably 3 or more sets, and can be, for example, 4 to 20 sets.

When the battery package 1 has two or more sets of conductor sheets 3, 3, the assembled battery 10A in which two or more unit batteries 2 are arranged in series is obtained. The number of the unit batteries 2 to be connected in series is preferably 3 or more, and is, for example, 4 to 20.

Since the battery package 1 having two or more sets of conductor sheets 3, 3 can constitute the assembled battery 10A in which two or more unit batteries 2 are arranged in series, this is preferable from a view point of electric power supply.

At least one of a plurality of adhesive parts 32A of the second conductor sheet 32 is electrically connected to at least one of adhesive parts 33A of the third conductor sheet 33 with a connecting part 39 interposed between the adhesive part 32A and the adhesive part 33A.

As shown in FIG. 15, the unit battery 2 is, for example, a lithium ion battery, and is provided with a positive electrode current collector 51, a positive electrode active material layer 52 contacting with the positive electrode current collector 51, a negative electrode current collector 53, a negative electrode active material layer 54 contacting with the negative electrode current collector 53, a separator 55, and an electrolyte 56.

The positive electrode current collector 51 and the negative electrode current collector 53 are composed of, for example, a metal. The positive electrode active material layer 52 contains, for example, a positive electrode active material such as a lithium-based material. The negative electrode active material layer 54 contains, for example, a negative electrode active material such as a carbon-based material. The separator 55 separates the positive electrode active material layer 52 from the negative electrode active material layer 54.

By electrically conductively abutting against the metal layer 6 of one of conductor sheets 3, 3 (conductor sheets 31, 33 in FIG. 15) constituting the cylindrical part 35, the positive electrode current collector 51 is electrically connected to this metal layer 6.

By electrically conductively abutting against the metal layer 6 of the other of conductor sheets 3, 3 (conductor sheets 32, 34 in FIG. 15) constituting the cylindrical part 35, the negative electrode current collector 53 is electrically connected to this metal layer 6.

An electrolyte 56 (electrolytic solution) is filled into the battery accommodating part 5. As the electrolyte 56, for example, propylene carbonate (PC), diethyl carbonate (DEC), ethylene carbonate (EC), and the like can be used. The electrolyte 56 (electrolytic solution) intervenes between the positive electrode current collector 51 and the negative electrode current collector 53.

The unit batteries 2 are provided in battery accommodating parts 5 of a plurality of cylindrical parts 35, respectively. It is preferable that the unit battery 2 has a flat shape, and has a constant thickness.

Since one and the other conductor sheets 3 constituting the cylindrical part 35 are connected to the positive electrode current collector 51 and the negative electrode current collector 53, respectively, they function as a terminal for connection.

FIG. 3 is a circuit view of an assembled battery 10A.

As shown in FIG. 3, a plurality of unit batteries 2A, 2A are connected in parallel with conductor sheets 31, 32. A plurality of unit batteries 2B, 2B are connected in parallel with conductor sheets 33, 34.

Unit batteries 2A, 2A and unit batteries 2B, 2B are connected in series with the connecting part 39.

[Assembled Battery] (Second Modified Example)

Figure 16:
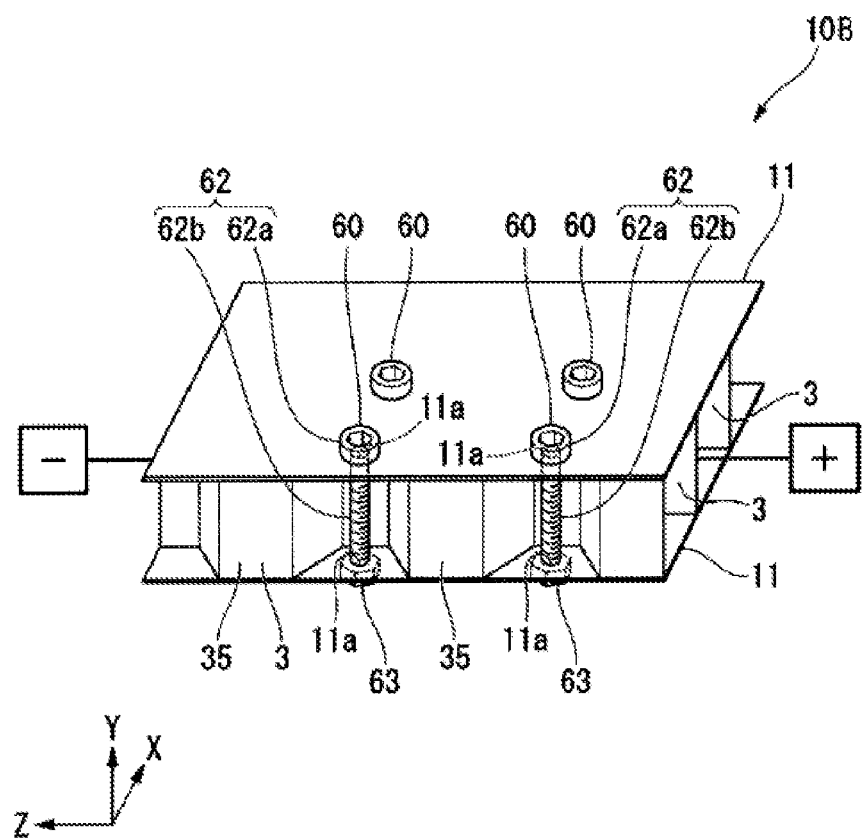
FIG. 16 is a perspective schematically showing a second modified example of an assembled battery of an embodiment.
Figure 17:
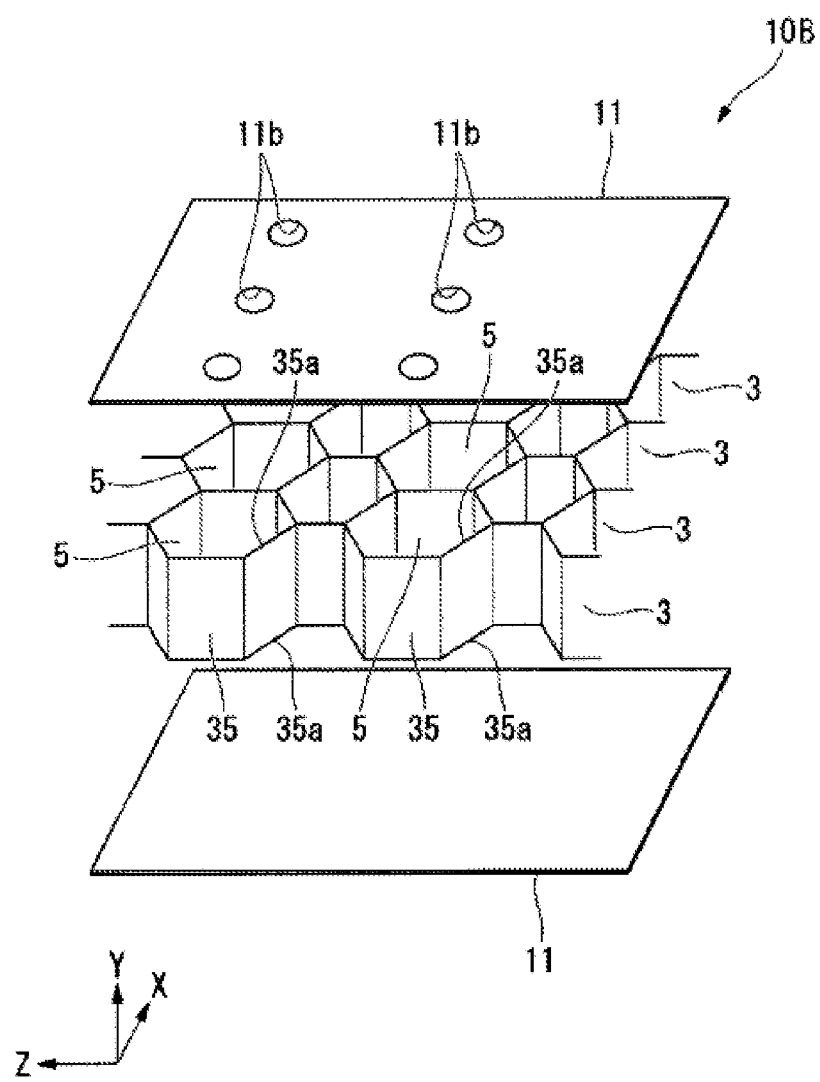
FIG. 17 is an exploded perspective view schematically showing a structure of an assembled battery of FIG. 16.

FIG. 16 is a sectional view schematically showing an assembled battery 10B which is a second modified example of the assembled battery of an embodiment. FIG. 17 is an exploded perspective schematically showing a structure of an assembled battery 10B.

As shown in FIG. 16 and FIG. 17, the assembled battery 10B has a battery package 1, a plurality of unit batteries 2 (see FIG. 15) which are provided in a battery accommodating part 5, and one pair of sealing plates 11, 11. The assembled battery 10B has a configuration that sealing plates 11, 11 are added to the assembled battery 10A shown in FIG. 15.

It is preferable that, as sealing plates 11, 11, a plate or foil composed of a metal is used, in order to prevent the moisture entering the battery package 1 from the outside. Sealing plates 11, 11 are provided in one and the other of the Y direction of the battery package 1, respectively, and seal one and the other openings of a cylindrical part 35.

It is preferable that sealing plates 11, 11 are adhered to the battery package 1 with an adhesive. Thereby, an opening of the cylindrical part 35 can be securely sealed.

Sealing plates 11, 11 are fixed to the battery package 1 with a fastening and fixing member 60. The fastening and fixing member 60 has, for example, a bolt 62 and a nut 63. A screw shaft part 62b of the bolt 62 is inserted into an insertion hole 11a from an external surface of one sealing plate 11, and can be fastened to the nut 63 on an external surface side of the other sealing plate 11. Thereby, sealing plates 11, 11 are pressed with a head part 62a of the bolt 62 and the nut 63 in a mutually approaching direction, and sealing plates 11, 11 can be fixed in the state where they are pushed against the battery package 1.

The bolt 62 can be inserted into an interior space 38 of a cylindrical part 37.

Since the fastening and fixing member 60 can arbitrarily determine a distance between the head part 62a and the nut 63, a pressing force to sealing plates 11, 11 can be adjusted.

Sealing plates 11, 11 abut against one and the other ends 35a of the cylindrical part 35 liquid-tightly, and can seal the battery accommodating part 5.

Figure 18:
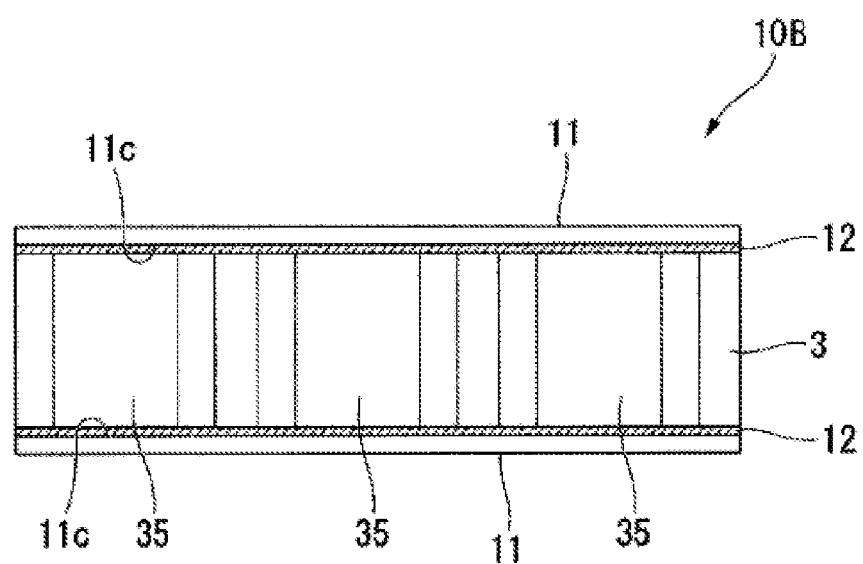
FIG. 18 is a side view schematically showing a modified example of an assembled battery of FIG. 16.

FIG. 18 is a side view showing a modified example of the assembled battery 10B. As shown in FIG. 18, a sealing layer 12 (sealing member) can be formed on an internal surface 11c (surface on battery package 1 side) of sealing plates 11, 11.

The sealing layer 12 is a layer composed of, for example, an elastic material such as an elastic adhesive (silicone resin or the like). It is preferable that the sealing layer 12 has the insulating property.

In the assembled battery 10B, an opening of the cylindrical part 35 can be assuredly sealed by abutting the sealing plate 11 against the battery package 1 with the sealing layer 12 interposed between the sealing plate 11 and the battery package 1.

[Method of Manufacturing Assembled Battery]

Then, one example of a method of manufacturing the assembled battery 10 will be illustrated.

(First Step: Adhering Step)

As shown in FIG. 4 (A), a long conductor sheet 70 is prepared.

As shown in FIG. 4 (B), an adhesive 4A is linearly coated on the conductor sheet 70.

As shown in FIG. 4 (C), a plurality of conductor sheets 70 are overlapped and adhered with the adhesive 4A.

(Second Step: Cutting Step)

As shown in FIG. 4 (C), a plurality of conductor sheets 70 are cut into a predetermined Y directional dimension using a cutter 71. Thereby, a battery package 72 composed of a plurality of conductor sheets 3 which are adhered with an adhesive layer composed of the adhesive 4A is obtained.

(Third Step: Spreading Step)

As shown in FIG. 4 (D), the plurality of conductor sheets 3 of the battery package 72 are spread, and a battery accommodating part 5 is formed (see FIG. 2).

(Fourth Step: Battery Accommodating Step)

As shown in FIG. 5 (A), the unit battery 2 is accommodated in the battery accommodating part 5, and by adding a tensile force in the width direction (X direction) to the battery package 1, or adding a compressive force in the thickness direction (Z direction), a thickness of the battery accommodating part 5 is adjusted, and the conductor sheet 3 is brought into the state where it is contacted with the unit battery 2, as shown in FIG. 5 (B).

Thereby, the assembled battery 10 shown in FIG. 1 is obtained.

Then, one example of a method of manufacturing the assembled battery 10A, 10B will be illustrated.

(First Step: Adhering Step)

As shown in FIG. 4 (A), a long conductor sheet 70 is prepared.

As shown in FIG. 4 (B), an adhesive 4A is linearly coated on the conductor sheet 70.

As shown in FIG. 4 (C), a plurality of conductor sheets 70 are overlapped and adhered with the adhesive 4A.

(Second Step: Cutting Step)

As shown in FIG. 4 (C), a plurality of conductor sheets 70 are cut into a predetermined Y directional dimension using a cutter 71. Thereby, a battery package 72 composed of a plurality of conductor sheets 3 which are adhered with an adhesive layer composed of the adhesive 4A is obtained.

(Third Step: Spreading Step)

As shown in FIG. 4 (D), the plurality of conductor sheets 3 of the battery package 72 are spread, and a battery accommodating part 5 is formed (see FIG. 2).

(Fourth Step: Battery Accommodating Step)

As shown in FIG. 5 (A), a battery body 2C is accommodated in the battery accommodating part 5 of the battery package 1. The battery body 2C contains a positive electrode current collector 51, a positive electrode active material layer 52, a negative electrode current collector 53, a negative electrode active material layer 54, a separator 55 and the like constituting the unit battery 2.

By adding a tensile force in the width direction (X direction) to the battery package 1, or adding a compressive force in the thickness direction (Z direction) of the conductor sheet 3, a thickness of the battery accommodating part 5 is adjusted, and the conductor sheet 3 is brought into the state where it is contacted with the battery body 2C, as shown in FIG. 5 (B).

By further adding a tensile force in the width direction (X direction), or adding a compressive force in the thickness direction (Z direction), to the battery package 1, a distance in the thickness direction between conductor sheets 3, 3 can be reduced. Thereby, an assembled battery 10B which improves the power generation efficiency of individual unit batteries 2, and is excellent in output characteristics is obtained.

(Fifth Step: Sealing Plate Installation Step)

As shown in FIG. 16 and FIG. 17, the battery package 1 accommodating the battery body 2C in the battery accommodating part 5 is arranged between sealing plates 11, 11. Thereupon, by pressing sealing plates 11, 11 to the battery package 1 with a fastening and fixing member 60, sealing plates 11, 11 are made to abut against the battery package 1.

An electrolyte 56 (electrolytic solution) is filled into a cylindrical part 35 through a filling hole 11b formed on one sealing plate 11. Then, the filling hole 11b is sealed using a sealing material such as a laminated film containing a metal layer. Thereby, the battery accommodating part 5 is sealed. Thereby, the assembled battery 10B shown in FIG. 16 is obtained.

Since in the assembled battery 10A shown in FIG. 15, a plurality of battery accommodating parts 5 are formed with a common conductor sheet 3, for example, a part of a connection structure or the like can be omitted as compared with a battery comprising a plurality of package containers individually packaging unit batteries, and thus, a structure of the assembled battery can be simplified. For that reason, miniaturization and light weighting of the assembled battery 10A can be attained.

Additionally, since the positive electrode current collector 51 and the negative electrode current collector 53 of the unit battery 2 are connected to conductor sheets 3, 3, conductor sheets 3, 3 can be made to function as a terminal. For that reason, a structure of the unit battery 2 can be simplified, and further miniaturization and light weighting of the assembled battery 10A are possible.

Since in the assembled battery 10A, a plurality of battery accommodating parts 5 are formed with a common conductor sheet 3, the assembled battery 10A is excellent in point of the mechanical strength, as compared with a battery comprising a plurality of package containers individually packaging unit batteries. When a tensile force in the width direction (X direction) of the conductor sheet 3, a shearing force in the length direction (Y direction) of the adhesive part, or a shearing force in the thickness direction (Z direction) is added, or the like, damage hardly occurs. Additionally, since the battery package 1 has a plurality of cylindrical parts 35 which are continuously formed with a common conductor sheet 3, durability to a compressive force in the length direction (Y direction) of the adhesive part can be enhanced.

Therefore, the assembled battery 10A can attain miniaturization and light weighting, and moreover, can afford sufficient durability.

Since the assembled battery 10A becomes small and light, it can also be applied to such intended use that an installation space is limited and such intended use that a weight easily becomes a problem. For example, the assembled battery 10A can be suitably used as the battery for cars, homes or the like.

Since the assembled battery 10A has a simple structure, it can be configured into plural steps (structure having a plurality of sets of conductor sheets 3) without complicating a structure. For that reason, the assembled battery 10A in which a plurality of unit batteries 2 are connected not only in parallel but also in series can be constructed. Hence, a variety of assembled batteries 10A in which battery capacity, voltage, and the like are in conformity with application purpose can be provided.

Since in the assembled battery 10A, intermediate parts 31E, 32E, 33E, 34E of conductor sheets 31, 32, 33, 34 have a bending shape that is convexed outwardly, a difference in a width dimension between intermediate parts of conductor sheets facing each other become smaller, as compared with the assembled battery in which one of conductor sheets facing each other is flat (see FIG. 11). For that reason, a dimension in the thickness direction (Z direction) can be easily adjusted. Hence, by adding a compressive force in the thickness direction to conductor sheets 3 to displace them in a mutually approaching direction, a distance between electrode plates can be reduced in the unit battery 2. Therefore, the energy efficiency can be enhanced, and performance of the assembled battery 10A as the battery can be enhanced.

Additionally, by adding a compressive force in the thickness direction to the battery package 1, the conductor sheet 3 can be assuredly contacted with the unit battery 2 to secure sufficient conduction.

In order to add a compressive force to the assembled battery 10A, a structure in which a pressing material having elasticity (not shown) is provided on at least one of the thickness direction (Z direction) of the battery packages 1 is possible.

Since in the assembled battery 10A, a difference in a width dimension between intermediate parts of conductor sheets facing each other can be reduced, the assembled battery 10A can be easily prepared using a plurality of overlapped flat conductor sheets 70, as shown in FIG. 17 (A) to FIG. 17 (D).

Since in the assembled battery 10A, the cylindrical part 35 is made to have a hexagonal tubular shape, the strength to a tensile force in the width direction (X direction) of the conductor sheet 3, a shearing force in the length direction (Y direction) of the adhesive part, or a shearing force in the thickness direction (Z direction) of the conductor sheet 3 can be enhanced. Additionally, since the cylindrical part 35 is made to have a hexagonal tubular shape, a sufficient volume can be secured in the cylindrical part 35.

Since in the assembled battery 10A, the interior space 38 is secured between the second conductor sheet 32 and the third conductor sheet 33, a temperature of the assembled battery 10A can be adjusted by passing a heat medium (cooling water, air for cooling or the like) through the interior space 38.

Since the interior space 38 is adjacent to the battery accommodating part 5, a temperature of the unit battery 2 in the battery accommodating part 5 can be effectively adjusted.

Since in the assembled battery 10A, adhesive parts 32A, 33A and adhesive parts 32B, 33B are alternately arranged in the width direction (X direction) in conductor sheets 32, 33, a structure becomes a honeycomb structure in which a plurality of cylindrical parts 35 are arranged in parallel in the width direction (X direction). For that reason, as described above, miniaturization and light weighting of the assembled battery 10A can be attained.

Since in the assembled battery 10A, adhesive parts 32B, 33B of conductor sheets 32, 33 are made to be wider in width relative to adhesive parts 32A, 33A, a sufficient width can be secured in the battery accommodating part 5 which is an interior space of the cylindrical part 35. Hence, unit batteries 2 can be densely arranged, and miniaturization of the assembled battery 10A can be attained.

Since in the assembled battery 10A, conductor sheets 3 have flexibility, such displacement that they approach to each other in the thickness direction (Z direction) in the cylindrical part 35 becomes easy. Hence, as described above, performance of the assembled battery 10A as the battery can be enhanced.

Then, a modified example of the battery package 1 will be illustrated. Hereinafter, concerning the same features as those of the battery package 1 shown in FIG. 1 and FIG. 2, the same symbol is added, and illustration is omitted in some cases.

FIG. 6 is a sectional view schematically showing an assembled battery 10C comprising a battery package 1A which is a first modified example of the battery package 1.

The battery package 1A has the same structure as that of the battery package 1 shown in FIG. 1 and FIG. 2 except that there are no conductor sheets 33, 34, and only one pair of conductor sheets 3 (31, 32) is used.

FIG. 7 is a sectional view schematically showing an assembled battery 10D comprising a battery package 1B which is a third modified example of the battery package 1.

The battery package 1B has the same structure as that of the battery package 1A shown in FIG. 6 except that in place of the first conductor sheet 31, a plurality of conductor sheets 81 which line up in the width direction (X direction) are used.

The conductor sheet 81 is made to have, for example, a belt-like shape of a constant width along the Y direction.

The conductor sheet 81 is adhered to an adhesive part 32A of the second conductor sheet 32 with an adhesive layer 41 at the adhesive part 81A which is a part containing both side edges.

A part between adhesive parts 81A, 81A of the first conductor sheet 81 (intermediate part 81E) and an intermediate part 32E of the second conductor sheet 32 form a cylindrical part 85.

FIG. 8 is a sectional view showing a cylindrical part 95 which is a first modified example of the cylindrical part 35. An intermediate part 91E1 of a first conductor sheet 31 has a substrate part 31C, and one pair of side plate parts 91D1, 91D1.

Side plate parts 91D1, 91D1 are made to have a curved shape (for example, arched cross section) that is convexed toward the outside of the cylindrical part 95, and extend inclined so as to gradually approach a second conductor sheet 32 in a widening direction from both side edges of the substrate part 31C. The intermediate part 91E1 has a bending shape that is convexed outward in a direction away from the second conductor sheet 32 (outwardly).

The intermediate part 92E1 of the second conductor sheet 32 has a substrate part 32C and one pair of side plate parts 92D1, 92D1. Side plate parts 92D1, 92D1 are made to have a curved shape that is convexed toward the outside of the cylindrical part 95 (for example, arched cross section), and extend inclined so as to gradually approach the first conductor sheet 31 in a widening direction from both side edges of the substrate part 32C. The intermediate part 92E1 is made to have a bending shape that is convexed outward in a direction away from the first conductor sheet 31 (outwardly).

Intermediate parts 91E1, 92E1 of conductor sheets 31, 32 form the cylindrical part 95. The cylindrical part 95 has a configuration which is preferable when one wants to enlarge a battery accommodating part 5 to increase the volume ratio of the battery in the assembled battery.

FIG. 9 is a sectional view showing a cylindrical part 105 which is a second modified example of the cylindrical part 35.

An intermediate part 91E2 of a first conductor sheet 31 has a substrate part 31C and one pair of side plate parts 91D2, 91D2. Side plate parts 91D2, 91D2 are made to have a curved shape that is convexed toward the inside of the cylindrical part 105 (for example, arched cross section), and extend inclined so as to gradually approach a second conductor sheet 32 in a widening direction from both side edges of the substrate part 31C. The intermediate part 91E2 is made to have a bending shape that is convexed outward in a direction away from the second conductor sheet 32 (outwardly).

The intermediate part 92E2 of the second conductor sheet 32 has a substrate part 32C and one pair of side plate parts 92D2, 92D2. Side plate parts 92D2, 92D2 are made to have a curved shape that is convexed toward the inside of cylindrical part 105 (for example, arched cross section), and extend inclined so as to gradually approach the first conductor sheet 31 in a widening direction from both side edges of the substrate part 32C. The intermediate part 92E2 is made to have a bending shape that is convexed outward in a direction away from the first conductor sheet 31 (outwardly).

Intermediate parts 91E2, 92E2 of conductor sheets 31, 32 form the cylindrical part 105. The cylindrical part 105 has a configuration which is preferable when one wants to enlarge an interior space 38 (see FIG. 2) to increase the efficiency of cooling with a heat medium such as cooling water.

FIG. 10 is a sectional view showing a cylindrical part 115 which is a third modified example of the cylindrical part 35.

An intermediate part 91E3 of a first conductor sheet 31 has a substrate part 31C and one pair of side plate parts 91D3, 91D3.

The side plate part 91D3 is made to have a S letter-like shape in which a first curved part 91D31 of a curved shape that is convexed toward the outside of the cylindrical part 115 (for example, arched cross section) and a second curved part 91D32 of a curved shape that is convexed toward the inside of the cylindrical part 115 (for example, arched cross section) are combined. The first curved part 91D31 is provided connecting to the substrate part 31C, and the second curved part 91D32 is provided connecting to an adhesive part 31A. Side plate parts 91D3, 91D3 extend inclined so as to gradually approach a second conductor sheet 32 in a widening direction from both side edges of the substrate part 31C.

An intermediate part 92E3 of the second conductor sheet 32 has a substrate part 32C and one pair of side plate parts 92D3, 92D3.

The side plate part 92D3 is made to have a S letter-like shape in which a first curved part 92D31 of a curved shape that is convexed toward the outside of the cylindrical part 115 (for example, arched cross section), and a second curved part 92D32 of a curved shape that is convexed toward the inside of the cylindrical part 115 (for example, arched cross section) are combined. The first curved part 92D31 is provided connecting to a substrate part 32C, and the second curved part 92D32 is provided connecting to an adhesive part 32A. Side plate parts 92D3, 92D3 extend inclined so as to gradually approach the first conductor sheet 31 in a widening direction from both side edges of the substrate part 32C.

Intermediate parts 91E3, 92E3 of conductor sheets 31, 32 form the cylindrical part 115. Since the cylindrical part 115 can be prepared even when a tensile force to be added to the conductor sheet 3 in a spreading step shown in FIG. 4 (D) is small, this is a configuration that manufacturing is easy.

For comparison, an assembled battery comprising a battery package having a different shape from that of the battery package 1 of an embodiment will be illustrated.

FIG. 11 is a sectional view schematically showing an assembled battery 110 comprising a battery package 101 which is different from the battery package 1 of an embodiment shown in FIG. 1.

The battery package 101 has first to fourth conductor sheets 131, 132, 133, 134.

An intermediate part 131E of the first conductor sheet 131 has a substrate part 131C and one pair of side plate parts 131D, 131D inclined to the substrate part 131C. An intermediate part 133E of the third conductor sheet 133 has a substrate part 133C and one pair of side plate parts 133D, 133D inclined to the substrate part 133C.

The second conductor sheet 132 and the fourth conductor sheet 134 are formed flat. For that reason, a cylindrical part 135 (135A) which is formed by the intermediate part 131E of the first conductor sheet 131 and the second conductor sheet 32, and a cylindrical part 135 (135B) which is formed by the intermediate part 133E of the third conductor sheet 133 and the fourth conductor sheet 134 have a quadrangular tubular shape of a trapezoidal cross section.

Since in the battery package 101, conductor sheets 132, 134 are flat as compared with the battery package 1 having a hexagonal tubular cylindrical part 35 (see FIG. 1), the cylindrical part 135 cannot be deformed in a widening direction, and it is difficult to adjust a distance between electrode plates. For that reason, this is disadvantageous in respect of the energy efficiency. Additionally, in the battery package 101, wrinkles are easily generated in conductor sheets 131, 132, 133, 134 at the time of manufacturing. Additionally, when a compressive force in the thickness direction (Z direction) is added to the battery package 101 (see FIG. 18), distortion is easily generated in conductor sheets 131, 132, 133, 134.

In addition, the present invention is not limited to above-mentioned embodiments, and can be variously altered within a range, where the gist of the present invention is not deviated.

In the battery package 1 shown in FIG. 1, both of conductor sheets 31, 32 are continuously formed in the width direction over a plurality of cylindrical parts 35, but such a configuration is also possible that only one of conductor sheets facing each other is continuously formed in the width direction over a plurality of cylindrical parts.

In the battery package 1 shown in FIG. 1, the adhesive layer 42 adhering the second conductor sheet 32 and the third conductor sheet 33 may not be of an integral structure, and for example, may be composed of two or more adhesive parts which are spaced in the width direction. Similarly, adhesive layers 41, 43 may also be composed of, for example, two or more adhesive parts which are spaced in the width direction.

As the conductor sheet, one having no flexibility may also be used.

In the battery package 1 shown in FIG. 1, intermediate parts 31E, 32E, 33E, 34E as a whole have a bending shape that is convexed outwardly, but the intermediate parts may have a bending shape that at least a part of them is convexed outwardly.

In the battery package 1, since side plate parts 31D, 32D, 33D, 34D of conductor sheets 31, 32, 33, 34 are inclined at an angle of less than 90° to substrate parts 31C, 32C, 33C, 34C, the cylindrical part 35 has a hexagonal tubular shape, but the angle may also be 90° or more.

The battery accommodated in the battery package 1 is not limited to a lithium ion battery, but may also be an electric double layer capacitor.

In the assembled battery 10 shown in FIG. 1, the positive electrode current collector 51 and the negative electrode current collector 53 of the unit battery 2 are electrically connected by directly abutting against the conductor sheet 3 of the battery package 1, but the positive electrode current collector 51 and the negative electrode current collector 53 may be electrically connected by indirectly abutting against the conductor sheet 3 with a conductor (not shown) interposed between the positive electrode current collector 51 and the negative electrode current collector 53.

As a structure for sealing an opening of the cylindrical part 35, a lid body which is a bilayer body composed of an open cell expanded resin sheet and a closed cell expanded resin sheet can be used. For example, by press-inserting the lid body in which the open cell expanded resin sheet was impregnated with an adhesive (for example, polyolefin-based adhesive) having electrolytic solution resistance, into the cylindrical part 35, an opening of the cylindrical part 35 can be sealed.

In order to impart the waterproof property to the assembled battery, a barrier material such as a metal foil can be provided on a surface layer of the lid body. The barrier material is provided so as not to generate a short circuit in the assembled battery. In addition, a structure for sealing the opening of the cylindrical part is not limited to this.

[Battery Device]

Figure 13:
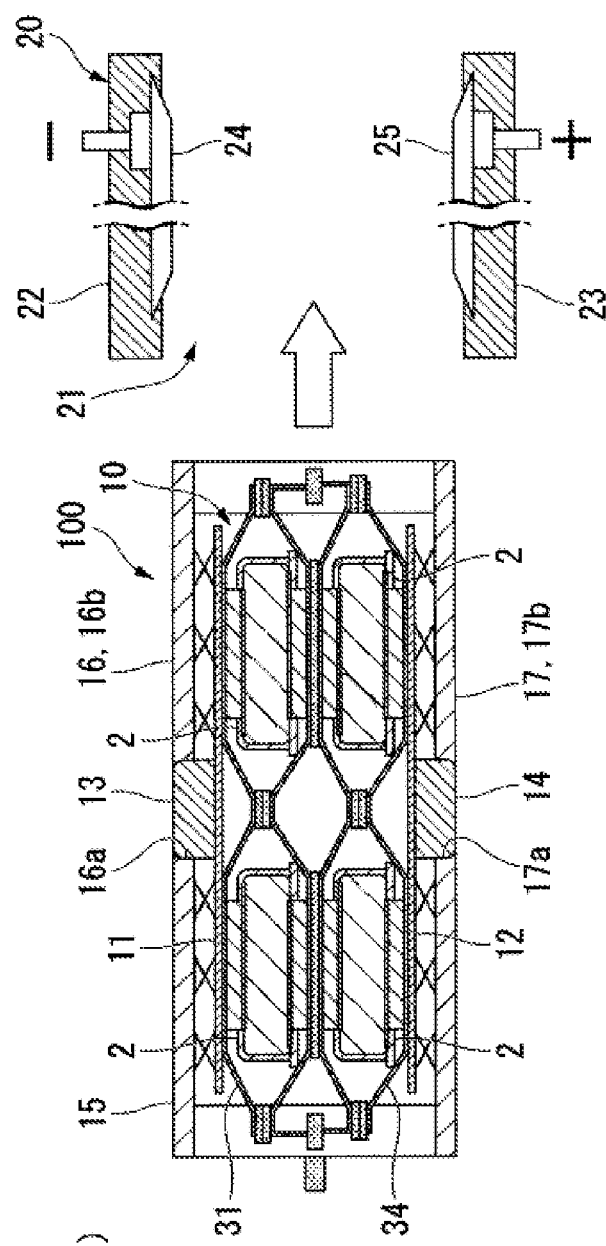
FIG. 13 (A) is a front view schematically showing an example of a battery device comprising an assembled battery of FIG. 1, and FIG. 13 (B) is a plan view showing a battery device of FIG. 13 (A)
Figure 13:
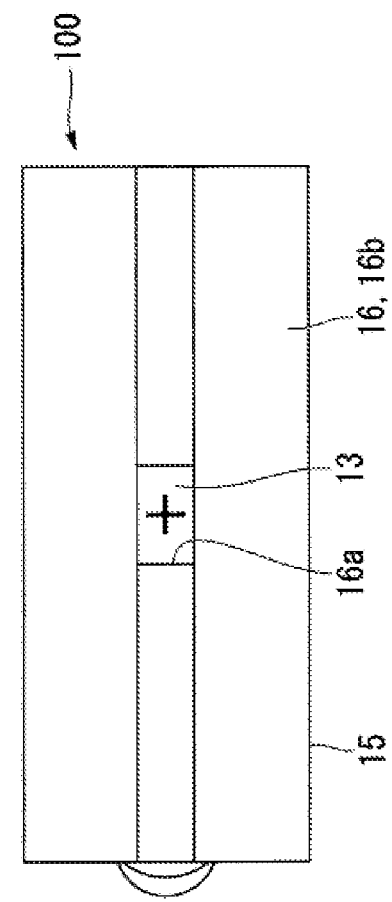

FIG. 13 (A) is a front view schematically showing a battery device 100 which is an example of a battery device comprising the assembled battery 10. FIG. 13 (B) is a plan view showing a battery device 100.

The battery device 100 is provided with the assembled battery 10, a top plate for connection 11 to be electrically connected to a conductor sheet 31, a bottom plate for connection 12 to be electrically connected to a conductor sheet 34, a first terminal 13 provided on the top plate for connection 11, a second terminal 14 provided on the bottom plate for connection 12, and a case 15 for accommodating the assembled battery 10.

Opening parts 16a, 17a are formed on the top plate 16 and the bottom plate 17 of the case 15, respectively. The first terminal 13 can be exposed on a top panel 16b of the top plate 16 through the opening part 16a. The second terminal 14 can be exposed on a bottom face 17b of the bottom plate 17 through the opening part 17a.

The battery device 100 is connected to a part to be connected 20, by fitting into a reception part 21 of the part to be connected 20, and can be used as an electric source.

The reception part 21 has an upper plate 22 and a lower plate 23 which are arranged facing at a distance. An upper terminal 24 is formed on a lower surface of the upper plate 22, and a lower terminal 25 is formed on an upper surface of the lower plate 23.

When the battery device 100 is fitted into the reception part 21, the first terminal 13 exposed on the top plate 16 of the case 15 abuts against the upper terminal 24, and is electrically connected thereto. The second terminal 14 exposed on the bottom plate 17 abuts against the lower terminal 25, and is electrically connected thereto. Hence, charge and discharge through the upper terminal 24 and the lower terminal 25 become possible.

Figure 14:
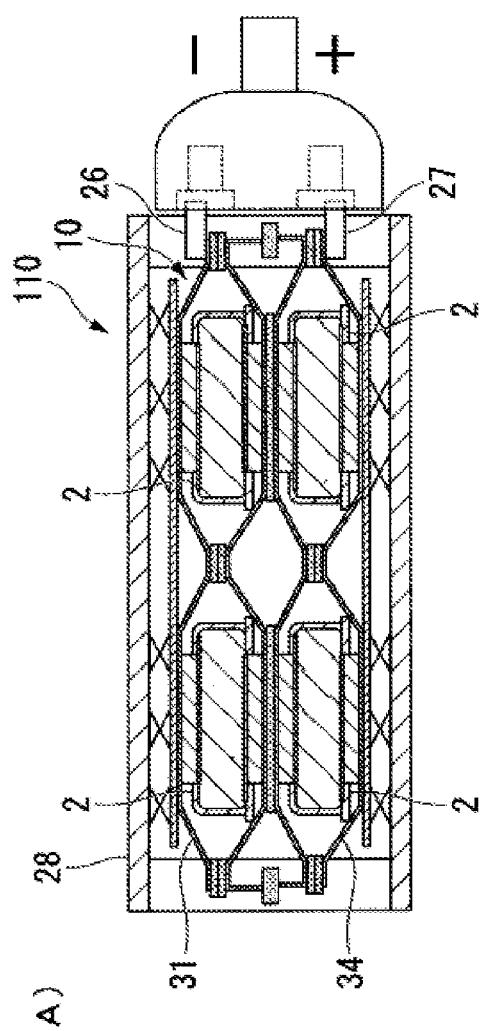
FIG. 14 (A) is a front view schematically showing another example of a battery device comprising an assembled battery of FIG. 1, and FIG. 14 (B) is a plan view showing a battery device of FIG. 14 (A)
Figure 14:
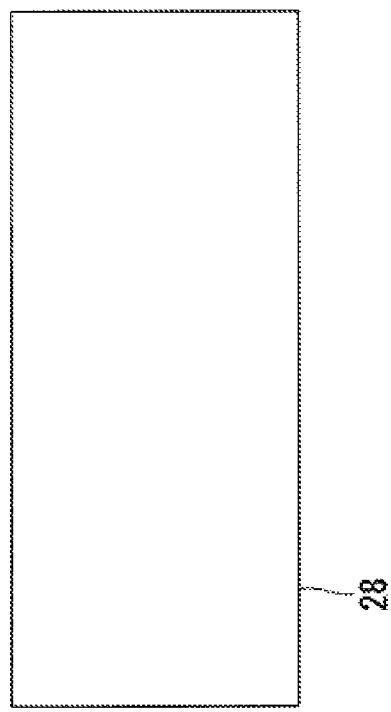

FIG. 14 (A) is a front view schematically showing a battery device 110 which is an example of a battery device comprising the assembled battery 10. FIG. 14 (B) is a plan view showing a battery device 110.

The battery device 110 is provided with the assembled battery 10, a first terminal 26 to be electrically connected to a conductor sheet 31, a second terminal 27 to be electrically connected to a conductor sheet 34, and a case 28 for accommodating the assembled battery 10.

The battery device 110 allows for charge and discharge through the first terminal 26 and the second terminal 27.

Since in the assembled battery 10 of the present embodiment, a plurality of battery accommodating parts 5 are formed with a common conductor sheet 3, for example, a part such as a connection structure can be omitted as compared with a battery comprising a plurality of package containers individually packaging unit batteries, and therefore, a structure of the assembled battery can be simplified. For that reason, miniaturization and light weighting of the assembled battery 10 can be attained.

Additionally, since in the assembled battery 10, a plurality of battery accommodating parts 5 are formed with a common conductor sheet 3, the assembled battery 10 is excellent in point of the mechanical strength, as compared with a battery comprising a plurality of package containers individually packaging unit batteries. For example, when a tensile force in the width direction (X direction) of the conductor sheet 3, a shearing force in the length direction (Y direction) of the adhesive part, or a shearing force in the thickness direction (Z direction) is added, damage hardly occurs. Additionally, since the battery package 1 has a plurality of cylindrical parts 35 which are continuously formed with a common conductor sheet 3, durability to a compressive force in the length direction (Y direction) of the adhesive part can be enhanced.

Therefore, the assembled battery 10 can attain miniaturization and light weighting, and moreover, can impart sufficient durability.

Since the assembled battery 10 becomes small and light, it can also be applied to such intended use that an installation space is limited and such intended use that a weight easily becomes a problem. For example, the assembled battery 10 can be suitably used as the battery for cars, homes or the like.

Since the assembled battery 10 has a simple structure, it can be configured into plural steps (structure having a plurality of sets of conductor sheets 3) without complicating a structure. For that reason, the assembled battery 10 in which a plurality of unit batteries 2 are connected not only in parallel but also in series can be configured. Hence, a variety of assembled batteries 10 in which battery capacity, voltage, and the like are in conformity with application purpose can be provided.

Since the assembled battery 10 has a bending shape that intermediate parts 31E, 32E, 33E, 34E of conductor sheets 31, 32, 33, 34 each is convexed toward the outside, a difference in a width dimension between intermediate parts of conductor sheets facing each other becomes smaller, as compared with an assembled battery in which one of conductor sheets facing each other is flat (see FIG. 11). For that reason, a dimension in the thickness direction (Z direction) can be easily adjusted. Hence, by adding a compressive force in the thickness direction to conductor sheets 3 to displace them in a mutually approaching direction, a distance between electrode plates can be reduced in the unit battery 2. Therefore, the energy efficiency can be enhanced, and performance of the assembled battery 10 as the battery can be enhanced.

Additionally, by adding a compressive force in the thickness direction to the battery package 1, the conductor sheet 3 can be assuredly contacted with the positive electrode terminal plate 52 and the negative electrode terminal plate 53 of the unit battery 2 to secure sufficient conduction.

In order to add a compressive force to the assembled battery 10, a structure in which a pressing material having elasticity (not shown) is provided on at least one of the thickness direction (Z direction) of the battery package 1 is possible.

Since in the assembled battery 10, a difference in a width dimension between intermediate parts of conductor sheets facing each other can be reduced, the assembled battery 10 can be easily prepared using a plurality of overlapped flat conductor sheets 70, as shown in FIG. 4 (A) to FIG. 4 (D).

Since in the assembled battery 10, the cylindrical part 35 is made to have a hexagonal tubular shape, the strength to a tensile force in the width direction (X direction) of the conductor sheet 3, a shearing force in the length direction (Y direction) of the adhesive part, or a shearing force in the thickness direction (Z direction) of the conductor sheet 3 can be enhanced. Additionally, since the cylindrical part 35 is made to have a hexagonal tubular shape, a sufficient volume can be secured in the cylindrical part 35.

Since in the assembled battery 10, the interior space 38 is secured between the second conductor sheet 32 and the third conductor sheet 33, a temperature of the assembled battery 10 can be adjusted by passing a heat medium (cooling water, air for cooling or the like) through the interior space 38.

Since the interior space 38 is adjacent to the battery accommodating part 5, a temperature of the unit battery 2 in the battery accommodating part 5 can be effectively adjusted.

Since in the assembled battery 10, the positive electrode terminal plate 52 and the negative electrode terminal plate 53 of the unit battery 2 are provided on one and the other surfaces of the battery body 51, respectively, it can planarly abut against the conductor sheet 3. For that reason, the conductor sheet 3 can be assuredly contacted with the positive electrode terminal plate 52 and the negative electrode terminal plate 53 of the unit battery 2 to secure sufficient conduction. Additionally, since a connection structure is simple, maintenance is also easy.

Since in the assembled battery 10, the unit battery 2 is accommodated in the battery accommodating part 5 to be freely taken in and out, work of exchanging the deteriorated unit battery 2 becomes easy.

Since in the assembled battery 10, adhesive parts 32A, 33A and adhesive parts 32B, 33B are alternately arranged in the width direction (X direction) in conductor sheets 32, 33, a structure becomes a honeycomb structure in which a plurality of cylindrical parts 35 are arranged in parallel in the width direction (X direction). For that reason, as described above, miniaturization and light weighting of the assembled battery 10 can be attained.

Since in the assembled battery 10, adhesive parts 32B, 33B of conductor sheets 32, 33 are made to be wider in width relative to adhesive parts 32A, 33A, a sufficient width can be secured in the battery accommodating part 5 which is an interior space of the cylindrical part 35. Hence, unit batteries 2 can be densely arranged, and miniaturization of the assembled battery 10 can be attained.

Since in the assembled battery 10, conductor sheets 3 have flexibility, such displacement that they mutually approach in the thickness direction (Z direction) in the cylindrical part 35 becomes easy. Hence, as described above, performance of the assembled battery 10 as the battery can be enhanced.

Then, a modified example of the battery package 1 will be illustrated. Hereinafter, concerning the same features as those of the battery package 1 shown in FIG. 1 and FIG. 2, the same symbol is added, and illustration is omitted in some cases.

FIG. 6 is a sectional view schematically showing an assembled battery 10C comprising a battery package 1A which is a first modified example of the battery package 1.

The battery package 1A has the same structure as that of the battery package 1 shown in FIG. 1 and FIG. 2 except that there are no conductor sheets 33, 34, and only one pair of conductor sheets 3 (31, 32) is used.

FIG. 7 is a sectional view schematically showing an assembled battery 10D comprising a battery package 1B which is a third modified example of the battery package 1.

The battery package 1B has the same structure as that of the battery package 1A shown in FIG. 6 except that in place of the first conductor sheet 31, a plurality of conductor sheets 81 which line up in the width direction (X direction) are used.

The conductor sheet 81 is made to have, for example, a belt-like shape of a constant width along the Y direction.

The conductor sheet 81 is adhered to an adhesive part 32A of the second conductor sheet 32 with an adhesive layer 41 at the adhesive part 81A which is a part containing both side edges.

A part between adhesive parts 81A, 81A of the first conductor sheet 81 (intermediate part 81E) and an intermediate part 32E of the second conductor sheet 32 form a cylindrical part 85.

FIG. 8 is a sectional view showing a cylindrical part 95 which is a first modified example of the cylindrical part 35. An intermediate part 91E1 of a first conductor sheet 31 has a substrate part 31C, and one pair of side plate parts 91D1, 91D1.

Side plate parts 91D1, 91D1 are made to have a curved shape (for example, arched cross section) that is convexed toward the outside of the cylindrical part 95, and extend inclined so as to gradually approach a second conductor sheet 32 in a widening direction from both side edges of the substrate part 31C. The intermediate part 91E1 has a bending shape that is convexed outward in a direction away from the second conductor sheet 32 (outwardly).

The intermediate part 92E1 of the second conductor sheet 32 has a substrate part 32C and one pair of side plate parts 92D1, 92D1. Side plate parts 92D1, 92D1 are made to have a curved shape that is convexed toward the outside of the cylindrical part 95 (for example, arched cross section), and extend inclined so as to gradually approach the first conductor sheet 31 in a widening direction from both side edges of the substrate part 32C. The intermediate part 92E1 is made to have a bending shape that is convexed outward in a direction away from the first conductor sheet 31 (outwardly).

Intermediate parts 91E1, 92E1 of conductor sheets 31, 32 form the cylindrical part 95. The cylindrical part 95 has a configuration which is preferable when one wants to enlarge a battery accommodating part 5 to increase the volume ratio of the battery in the assembled battery.

FIG. 9 is a sectional view showing a cylindrical part 105 which is a second modified example of the cylindrical part 35.

An intermediate part 91E2 of a first conductor sheet 31 has a substrate part 31C and one pair of side plate parts 91D2, 91D2. Side plate parts 91D2, 91D2 are made to have a curved shape that is convexed toward the inside of the cylindrical part 105 (for example, arched cross section), and extend inclined so as to gradually approach a second conductor sheet 32 in a widening direction from both side edges of the substrate part 31C. The intermediate part 91E2 is made to have a bending shape that is convexed outward in a direction away from the second conductor sheet 32 (outwardly).

The intermediate part 92E2 of the second conductor sheet 32 has a substrate part 32C and one pair of side plate parts 92D2, 92D2. Side plate parts 92D2, 92D2 are made to have a curved shape that is convexed toward the inside of cylindrical part 105 (for example, arched cross section), and extend inclined so as to gradually approach the first conductor sheet 31 in a widening direction from both side edges of the substrate part 32C. The intermediate part 92E2 is made to have a bending shape that is convexed outward in a direction away from the first conductor sheet 31 (outwardly).

Intermediate parts 91E2, 92E2 of conductor sheets 31, 32 form the cylindrical part 105. The cylindrical part 105 has a configuration which is preferable when one wants to enlarge an interior space 38 (see FIG. 2) to increase the efficiency of cooling with a heat medium such as cooling water.

FIG. 10 is a sectional view showing a cylindrical part 115 which is a third modified example of the cylindrical part 35.

An intermediate part 91E3 of a first conductor sheet 31 has a substrate part 31C and one pair of side plate parts 91D3, 91D3.

The side plate part 91D3 is made to have a S letter-like shape in which a first curved part 91D31 of a curved shape that is convexed toward the outside of the cylindrical part 115 (for example, arched cross section) and a second curved part 91D32 of a curved shape that is convexed toward the inside of the cylindrical part 115 (for example, arched cross section) are combined. The first curved part 91D31 is provided connecting to the substrate part 31C, and the second curved part 91D32 is provided connecting to an adhesive part 31A. Side plate parts 91D3, 91D3 extend inclined so as to gradually approach a second conductor sheet 32 in a widening direction from both side edges of the substrate part 31C.

An intermediate part 92E3 of the second conductor sheet 32 has a substrate part 32C and one pair of side plate parts 92D3, 92D3.

The side plate part 92D3 is made to have a S letter-like shape in which a first curved part 92D31 of a curved shape that is convexed toward the outside of the cylindrical part 115 (for example, arched cross section), and a second curved part 92D32 of a curved shape that is convexed toward the inside of the cylindrical part 115 (for example, arched cross section) are combined. The first curved part 92D31 is provided connecting to a substrate part 32C, and the second curved part 92D32 is provided connecting to an adhesive part 32A. Side plate parts 92D3, 92D3 extend inclined so as to gradually approach the first conductor sheet 31 in a widening direction from both side edges of the substrate part 32C.

Intermediate parts 91E3, 92E3 of conductor sheets 31, 32 form the cylindrical part 115. Since the cylindrical part 115 can be prepared even when a tensile force to be added to the conductor sheet 3 in a spreading step shown in FIG. 4 (D) is small, this is a configuration that manufacturing is easy.

For comparison, an assembled battery comprising a battery package having a different shape from that of the battery package 1 will be illustrated.

FIG. 11 is a sectional view schematically showing an assembled battery 110 comprising a battery package 101 which is different from the battery package 1 shown in FIG. 1.

The battery package 101 has first to fourth conductor sheets 131, 132, 133, 134.

An intermediate part 131E of the first conductor sheet 131 has a substrate part 131C and one pair of side plate parts 131D, 131D inclined to the substrate part 131C. An intermediate part 133E of the third conductor sheet 133 has a substrate part 133C and one pair of side plate parts 133D, 133D inclined to the substrate part 133C.

The second conductor sheet 132 and the fourth conductor sheet 134 are formed flat. For that reason, a cylindrical part 135 (135A) which is formed by the intermediate part 131E of the first conductor sheet 131 and the second conductor sheet 32, and a cylindrical part 135 (135B) which is formed by the intermediate part 133E of the third conductor sheet 133 and the fourth conductor sheet 134 have a quadrangular tubular shape of a trapezoidal cross section.

Since in the battery package 101, conductor sheets 132, 134 are flat as compared with the battery package 1 having a hexagonal tubular cylindrical part 35 (see FIG. 1), the cylindrical part 135 cannot be deformed in a widening direction, and it is difficult to adjust a distance between electrode plates. For that reason, this is disadvantageous in respect of the energy efficiency. Additionally, in the battery package 101, wrinkles are easily generated in conductor sheets 131, 132, 133, 134 at the time of manufacturing. Additionally, when a compressive force in the thickness direction (Z direction) is added to the battery package 101 (see FIG. 5), distortion is easily generated in conductor sheets 131, 132, 133, 134.

In addition, the present invention is not limited to above-mentioned embodiments, and can be variously altered within a range, where the gist of the present invention is not deviated.

In the battery package 1 shown in FIG. 1, both of conductor sheets 31, 32 are continuously formed in the width direction over a plurality of cylindrical parts 35, but such a configuration is also possible that only one of conductor sheets facing each other is continuously formed in the width direction over a plurality of cylindrical parts.

In the battery package 1 shown in FIG. 1, the adhesive layer 42 adhering the second conductor sheet 32 and the third conductor sheet 33 may not be of an integral structure, and for example, may be composed of two or more adhesive parts which are spaced in the width direction. Similarly, adhesive layers 41, 43 may also be composed of, for example, two or more adhesive parts which are spaced in the width direction.

As the conductor sheet, one having no flexibility may also be used.

In the battery package 1 shown in FIG. 1, intermediate parts 31E, 32E, 33E, 34E as a whole have a bending shape that is convexed outwardly, but the intermediate parts may have a bending shape that at least a part of them is convexed outwardly.

In the battery package 1, since side plate parts 31D, 32D, 33D, 34D of conductor sheets 31, 32, 33, 34 are inclined at an angle of less than 90° to substrate parts 31C, 32C, 33C, 34C, the cylindrical part 35 has a hexagonal tubular shape, but the angle may also be 90° or more.

The battery accommodated in the battery package 1 is not limited to a lithium ion battery, but may also be an electric double layer capacitor.

What is claimed is:

1. A battery package comprising:
a plurality of sets of one pair of conductor sheets facing each other,
wherein
the one pair of conductor sheets facing each other has a plurality of linear adhesive parts;
the plurality of linear adhesive parts are formed apart from each other in a width direction orthogonal to a length direction;
the one pair of conductor sheets facing each other form a plurality of cylindrical parts partitioned with the plurality of linear adhesive parts;
a battery accommodating part is secured inside each of the plurality of cylindrical parts;
the one pair of conductor sheets facing each other is continuously formed in a width direction over the plurality of cylindrical parts;
each of the plurality of cylindrical parts is formed with intermediate parts between adjacent two of the plurality of linear adhesive parts of the one pair of conductor sheets facing each other;
at least a part of each of the intermediate parts of the one pair of conductor sheets facing each other has a bending shape that is convexed outward;
each of the one pair of conductor sheets facing each other is partially adhered to opposite one of the one pair of conductor sheets facing each other at the plurality of linear adhesive parts on its one surface, and is partially adhered to other set of one pair of conductor sheets facing each other at a plurality of adhesive parts on the other surface, wherein the plurality of linear adhesive parts on the one surface of the plurality of adhesive parts on the other surface are alternately arranged in a width direction; and
a space is secured between one set of the plurality of sets of one pair of conductor sheets facing each other and the other set of one pair of conductor sheets facing each other, the two sets adjoining to each other in a thickness direction.

2. The battery package according to claim 1, wherein each of the intermediate parts of the one pair of conductor sheets facing each other has a substrate part and one pair of side plate parts extending inclined to the substrate part so as to approach opposite one of the one pair of conductor sheets facing each other toward a widening direction from both side edges of the substrate part, and each of the plurality of cylindrical parts is formed into a hexagonal tubular shape with the substrate parts and the side plate parts which the intermediate parts of the one pair of conductor sheets facing each other have.

3. The battery package according to claim 1, wherein each of the one pair of conductor sheets facing each other has a metal layer, and the metal layer faces the battery accommodating part.

4. The battery package according to claim 3, wherein the metal layer is formed of a metal foil comprising one or more kinds selected from the group consisting of aluminum, copper, stainless steel, nickel, and iron.

5. The battery package according to claim 3, wherein each of the one pair of conductor sheets facing each other is formed of a laminate further having a resin layer, and the resin layer comprises one or more kinds selected from the group consisting of polyester, polyamide, polyimide, polyolefin, an acrylic resin, polyurethane, a fluorine resin, and a thermosetting resin.

6. The battery package according to claim 1, wherein the one pair of conductor sheets facing each other are adhered with a polyolefin-based adhesive at the plurality of linear adhesive parts on its one surface and the plurality of adhesive parts on the other surface.

7. The battery package according to claim 6, wherein the polyolefin-based adhesive comprises an acid-modified polyolefin and a crosslinking agent.

8. An assembled battery comprising:
a plurality of unit batteries each having a battery container and a battery body covered with the battery container; and
the battery package as defined in claim 1,
wherein
the plurality of unit batteries are each accommodated in a plurality of battery accommodating parts of the battery package.

9. The assembled battery according to claim 8, wherein each of the plurality of unit batteries has a flat shape.

10. A battery device comprising:
the assembled battery as defined in claim 8;
a case for accommodating the assembled battery;
a first terminal to be electrically connected to one of the one pair of conductor sheets facing each other; and
a second terminal to be electrically connected to the other of the one pair of conductor sheets facing each other.

11. An assembled battery comprising:
a plurality of unit batteries; and
the battery package as defined in claim 1,
wherein
each of the unit batteries comprises:
a positive electrode current collector;
a positive electrode active material layer contacting with the positive electrode current collector;
a negative electrode current collector;
a negative electrode active material layer contacting with the negative current collector;
a separator separating the positive electrode active material layer and the negative electrode active material layer; and
an electrolyte,
the plurality of unit batteries are each provided in a plurality of battery accommodating parts of the battery package,
the positive electrode current collector electrically conductively abuts against one of the one pair of conductor sheets facing each other, and
the negative electrode current collector electrically conductively abuts against the other of the one pair of conductor sheets facing each other.

12. The assembled battery according to claim 11, wherein sealing plates are disposed on both ends in a length direction of the plurality of linear adhesive parts of the battery package respectively.

13. The assembled battery according to claim 12, wherein the sealing plates abut against openings of both ends in a length direction of the plurality of linear adhesive parts of the battery package with a sealing member.

14. The assembled battery according to claim 12, wherein one pair of the sealing plates face each other and are fixed to the battery package with a fastening and fixing member.

* * * * *